United States Patent
Miyamoto et al.

(10) Patent No.: US 7,057,892 B2
(45) Date of Patent: Jun. 6, 2006

(54) DISK ARRAY DEVICE

(75) Inventors: Kenichi Miyamoto, Odawara (JP);
Yasuji Morishita, Odawara (JP);
Toshiyasu Hattori, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/264,008

(22) Filed: Nov. 2, 2005

(65) Prior Publication Data
US 2006/0056148 A1 Mar. 16, 2006

Related U.S. Application Data

(63) Continuation of application No. 10/774,591, filed on Feb. 10, 2004, now Pat. No. 7,016,191.

(30) Foreign Application Priority Data
Nov. 28, 2003 (JP) .............................. 2003-400302

(51) Int. Cl.
*H05K 7/20* (2006.01)

(52) U.S. Cl. ...................... 361/687; 361/685; 361/724; 454/186

(58) Field of Classification Search ................ 361/683, 361/684, 685, 686, 687, 695, 724, 680, 694; 312/223.1, 223.2; 454/184–186; 165/80.1–80.5, 165/104.34
See application file for complete search history.

(56) References Cited

U.S. PATENT DOCUMENTS

| 5,173,819 A | 12/1992 | Takahashi et al. |
| 5,388,032 A | 2/1995 | Gill et al. |
| 5,414,591 A | 5/1995 | Kimura et al. |
| 6,021,047 A | 2/2000 | Lopez et al. |
| 6,039,414 A | 3/2000 | Melane et al. |
| 6,041,851 A | 3/2000 | Diebel et al. |
| 6,129,434 A | 10/2000 | Melane et al. |
| 6,175,490 B1 | 1/2001 | Papa et al. |

(Continued)

FOREIGN PATENT DOCUMENTS

EP 0 776 009 A2 11/1991

(Continued)

OTHER PUBLICATIONS

European Search Report dated Apr. 14, 2005.

*Primary Examiner*—Lynn Feild
*Assistant Examiner*—Corey Broussard
(74) *Attorney, Agent, or Firm*—Reed Smith LLP; Stanley P. Fisher, Esq.; Juan Carlos A. Marquez, Esq.

(57) ABSTRACT

The invention improves reliability relating to the operating environment temperature and the operating time of a processor for management in a disk array device mounting the managing processor for managing the state of the device, and further realizes mounting having no bad influence on the temperature environment within the disk array device.

The disk array device uses a dedicated PC for industry in the processor for management, and is constructed such that the processor for management and a computer for output used to output management information of this processor for management are separated. Further, the processor for management and the computer for output are arranged within a disk array box body in positions for preventing no flow of a ventilating wind within the disk array box body. Here, when the computer for output is used, the disk array device is set to a mode in which the computer for output is pulled out of the disk array box body and is further rotated and used.

20 Claims, 18 Drawing Sheets

U.S. PATENT DOCUMENTS

| | | |
|---|---|---|
| 6,353,532 B1 | 3/2002 | Landrum et al. |
| 6,442,030 B1 | 8/2002 | Mammoser et al. |
| 6,583,989 B1 | 6/2003 | Guyer et al. |
| 6,621,692 B1 | 9/2003 | Johnson et al. |
| 6,742,068 B1 | 5/2004 | Gallagher et al. |
| 2001/0054136 A1 | 12/2001 | Ninomiya et al. |
| 2002/0196601 A1 | 12/2002 | Lee et al. |
| 2003/0053293 A1 | 3/2003 | Beitelmal et al. |

FOREIGN PATENT DOCUMENTS

| | | |
|---|---|---|
| EP | 0 635 836 A1 | 7/1994 |
| JP | 07-261874 | 3/1994 |

DISK ARRAY DEVICE

CROSS-REFERENCE TO RELATED APPLICATION

The present application is a continuation of U.S. patent application Ser. No. 10/774,591 filed on Feb. 10, 2004 now U.S. Pat. No. 7,016,191, which claims priority to Japanese Patent Application 2003-400302 filed on Nov. 28, 2003, the contents of which are hereby incorporated by reference into this application.

BACKGROUND OF THE INVENTION

1. Field of the Invention

The present invention relates to a disk array device mounting plural disk drives storing data thereto, and writing data from a host device or reading the data to the host device by controlling the operations of these plural disk drives.

2. Description of the Related Art

The disk array device is generally constructed by arranging a disk unit section and a disk controller section. In the disk unit section, plural disk drives are stored into a disk drive box body, and data are stored to these plural disk drives. The disk controller section is a portion for mounting various kinds of devices for controlling the operation of the disk array device. As these devices, a disk adapter board for controlling the writing or reading operation of data with respect to the plural disk drives, a channel adapter board for receiving data from a host computer as the host device, a memory board for storing data and control information written or read from this channel adapter board and the disk adapter board, etc. are stored into a controller box body.

A processor (SVP) for management is mounted to such a disk array device as a means for managing a state within the disk array device. Namely, this processor for management has a function for monitoring the operating situations of hardware and software within the disk array device, and transmitting monitored information (including a warning at an error generating time) to the exterior, and notifying the monitored information to a maintenance worker, a function for notifying maintenance procedure start and termination to the disk array device and preparing a corresponding state by inputting maintenance exchange work start and termination, etc. to the processor for management by the maintenance worker in breakdown part exchange at the breakdown generating time of the hardware, etc.

For example, there is conventionally a device disclosed in the following patent document 1 as the disk array device mounting this processor for management thereto.

[Patent document 1] JP-A-7-20994

A notebook type PC (personal computer) sold at a market was used as this processor for management in the conventional disk array device. However, there are the following problems when this notebook type PC sold at a market is used as the processor for management in the disk array device.

Namely, since the processor for management is arranged within the disk array device, there is a case in which an operating environment temperature is raised until about 40° C. Therefore, there is a problem in reliability in setting the operating environment (until about 32° C.) of the notebook type PC as a product sold at a market. In particular, an increase in the size of the disk array device is recently advanced, and it is considered that the operating environment temperature is raised as the disk array device is large-sized. Accordingly, the problem of reliability of the notebook type PC as a product sold at a market is more and more important.

The disk array device is operated for 24 hours for five to seven years. The processor for management as one portion of the device must be also continuously operated for the same time. However, the specification of the notebook type PC as a product sold at a market is set such that the notebook type PC is continuously used for about five hours per day for two to three years. Therefore, it is severe in the specification to mount the notebook type PC to the disk array device.

Further, since the notebook type PC as a product sold at a market is frequently changed in model, the model change is also necessary in the notebook type PC mounted to the disk array device (there is a case in which no model at a first forwarding time is sold at the breakdown time of the notebook type PC). Therefore, the notebook type PC of a new model must be verified in operation every case.

Further, the interior of the disk array device is generally cooled by arranging a fan for exhaust. However, when the processor for management is intended to be mounted to a place easy in use within the disk array device, the processor for management prevents the flow of a cooling wind so that the processor for management has a bad influence on the temperature environment within the disk array device as a result.

SUMMARY OF THE INVENTION

The present invention is made in consideration of such problems, and its object is to improve reliability relating to the operating environment temperature and the operating time of the processor for management in the disk array device mounting the managing processor for managing the state within the device, and further realize mounting having no bad influence on the temperature environment within the disk array device.

To achieve the above object, a disk array device of the present invention comprises:

a disk array box body for arranging a box body therein;

a disk drive box body in which plural disk drives for storing data are spaced at intervals for ventilation and are arranged in a matrix shape;

a controller box body constructed by arranging plural disk adapter boards for controlling the writing or reading operation of data with respect to the plural disk drives within the disk drive box body, plural host adapter boards connected to a host device and receiving data from the host device, and plural memory boards for storing data and control information written or read from the host adapter board and the disk adapter board, such that the plural disk adapter boards, the plural host adapter boards and the plural memory boards are spaced and arranged at intervals for ventilation;

a processor for management constructed by a PC for industry connected to the plural disk adapter boards, the plural host adapter boards and the plural memory boards within the controller box body, and collecting and managing management information relating to the plural disk adapter boards, the plural host adapter boards and the plural memory boards;

a computer for output used to output the management information managed by the processor for management;

a fan for exhaust for exhausting a ventilating wind flowed via the interior of the controller box body and a ventilating wind flowed via the interior of the disk drive box body to the exterior of the disk array box body; and a power source device for supplying electric power to the plural disk drives within the disk drive box body, the plural disk adapter boards, the plural host adapter boards and the plural memory boards within the controller box body, the processor for management, the computer for output and the fan for exhaust;

wherein the disk array box body is constructed such that the processor for management and the computer for output are arranged in positions for preventing no flow of a ventilating wind within the disk drive box body; and the computer for output is pulled out of the disk array box body and is further rotated and utilized when the management information is outputted and utilized.

In the disk array device of the present invention, reliability relating to the operating environment temperature is improved and reliability relating to the operating time is also improved by using the dedicated PC for industry in the processor for management. Further, the disk array device of the present invention is constructed by separating the processor for management and the computer for output used in the output of this processor for management. Therefore, it is sufficient to start the computer for output only when a maintenance worker sees the state of the disk array device. Accordingly, a notebook type PC sold at a market can be also used without any problem of the operating time.

The disk array device of the present invention is constructed by arranging the processor for management and the computer for output in the positions for preventing no flow of the ventilating wind within the disk array box body. Accordingly, the processor for management and the computer for output have no bad influence on the temperature environment within the disk array device. Further, the computer for output is pulled out of the disk array box body and is further rotated and used. Therefore, the disk array device is set to a mode easy for the worker to use the computer for output.

DESCRIPTION OF THE PREFERRED EMBODIMENTS

The embodiments of the present invention will next be explained in detail with reference to the drawings.

Figure 1:
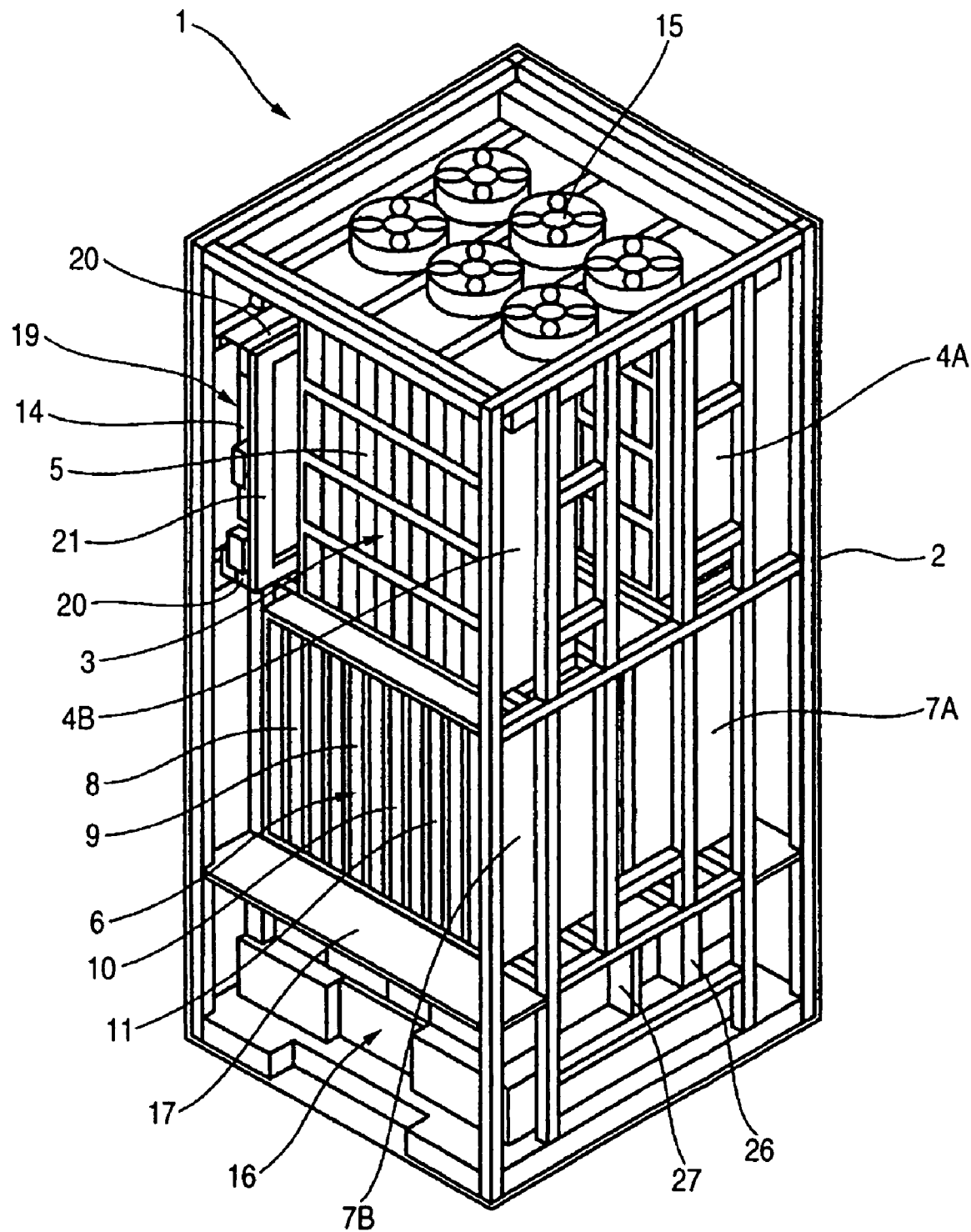
FIG. 1 is a perspective view in which the disk array device of a first embodiment of the present invention is seen from the front face side.
Figure 2:
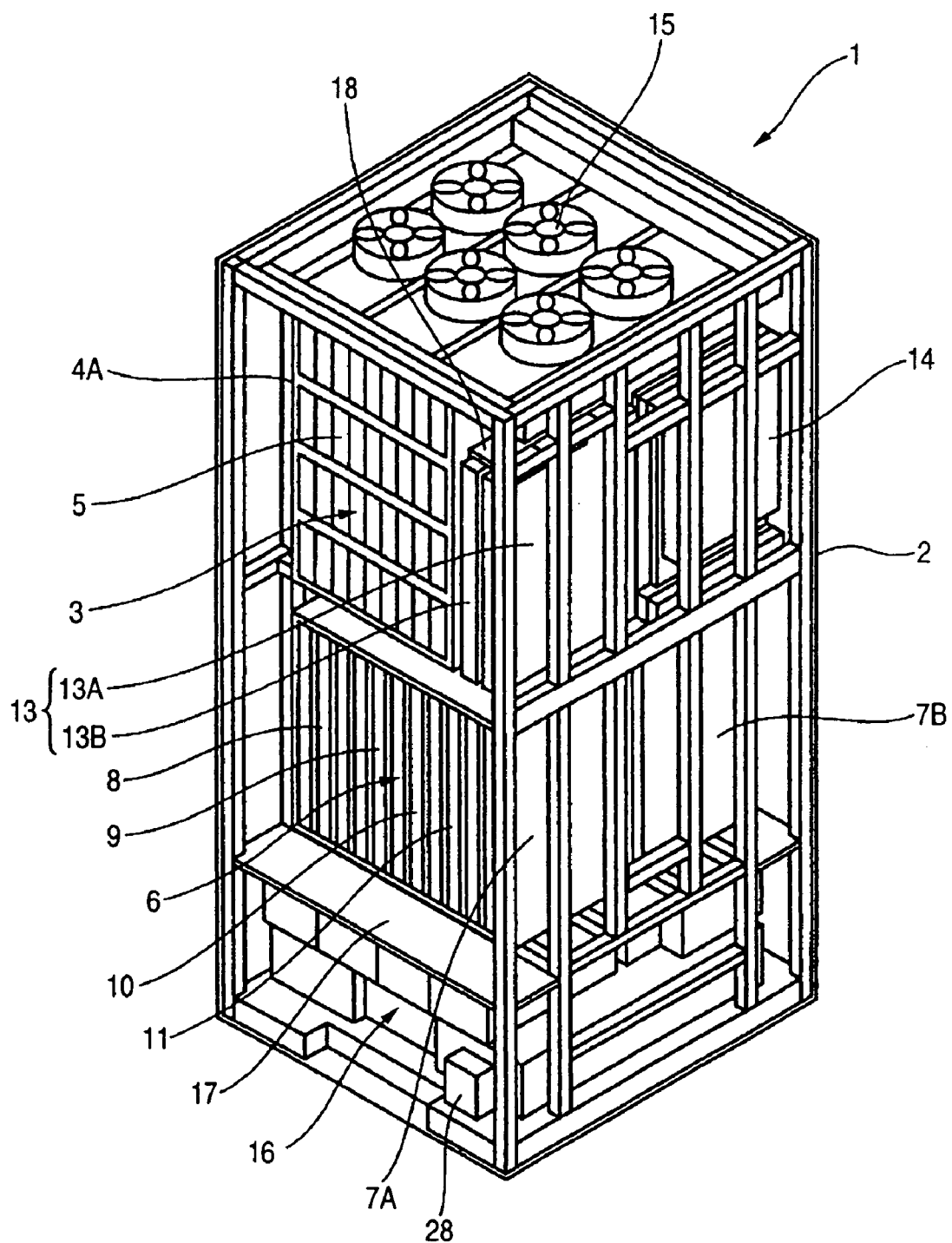
FIG. 2 is a perspective view of the disk array device seen from the rear face side.
Figure 3:
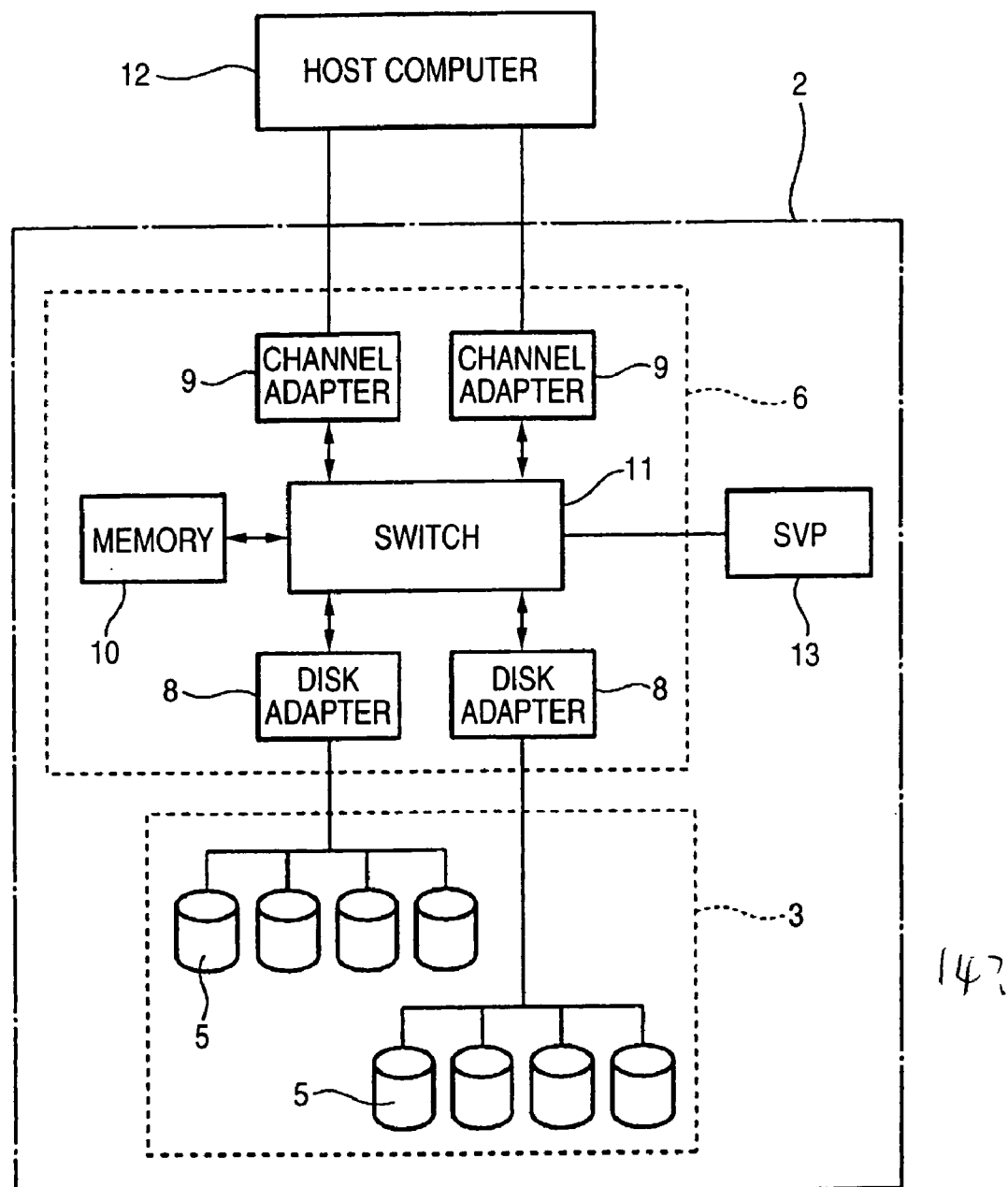
FIG. 3 is a block diagram showing the construction of a main circuit of the disk array device.

FIG. 1 is a perspective view in which the disk array device of a first embodiment of the present invention is seen from the front face side. FIG. 2 is a perspective view of the disk array device seen from the rear face side. FIG. 3 is a block diagram showing the construction of a main circuit of the disk array device.

This disk array device 1 is constructed by arranging a disk unit section 3 and a disk controller section 6 within a disk array box body 2.

In the disk unit section 3, plural (many) disk drives 5 are stored into a disk drive box body and data are stored to these plural disk drives 5.

The disk controller section 6 is a portion for mounting various kinds of devices for controlling the operation of the disk array device. As these devices, a disk adapter board 8 for controlling the writing or reading operation of data with respect to the plural disk drives 5, a channel adapter board 9 as a host adapter board connected to a host computer 12 as a host device and receiving data from this host computer 12, a memory board 10 for storing data and control information written or read from this channel adapter board 9 and the disk adapter board 8, a switch board 11 for relaying data between the above respective boards 8, 9, 10, etc. are stored into the controller box body. A cache memory and a shared memory are arranged in the above memory board 10. Data written or read from the channel adapter board 9 and the disk adapter board 8 are stored to the cache memory. Information (e.g., information showing a hard disk drive as a storing destination of data, the writing of data, etc.) relating to data is stored to the shared memory when data are written or read to the cache memory of the memory board 10 from the channel adapter board 9 and the disk adapter board 8.

As clearly shown in FIGS. 1 and 2, the disk unit section 3 and the disk controller section 6 are symmetrically arranged on the front face side and the rear face side of the disk array box body 2 in the disk array device 1 of this example.

Namely, the disk drive box body is constructed by a first disk drive box body 4A arranged on the rear face side of the disk array box body 2, and a second disk drive box body 4B arranged on the front face side of the disk array box body 2. The above plural disk drives 5 are respectively spaced and arranged at intervals for ventilation in a matrix shape in the first disk drive box body 4A and the second disk drive box body 4B. Here, as shown in FIG. 1, many disk drives 5 are arranged in the transversal direction in a state in which these disk drives 5 are longitudinally arranged. Further, these disk drives 5 are arranged in the matrix shape in which these disk drives 5 are arranged at many stages in the vertical direction. Predetermined intervals are formed between the respective disk drives so as to form the passage of a cooling wind flowed into the disk drive box body.

The controller box body is constructed by a first controller box body 7A arranged on the rear face side of the disk array box body 2 and a second controller box body 7B arranged on the front face side of the disk array box body 2. The disk adapter board 8, the channel adapter board 9, the memory board 10 and the switch board 11 mentioned above are respectively spaced and arranged in the plural at intervals for ventilation in the first controller box body 7A and the second controller box body 7B. Here, as shown in FIG. 1, the respective boards 8, 9, 10, 11 are stored and arranged in the transversal direction in a state in which these boards vertically rise. Predetermined intervals are formed between the respective boards so as to form the passage of the cooling wind flowed into the controller box body.

The front and rear faces of each of the first disk drive box body 4A and the second disk drive box body 4B are opened and ventilation holes are formed everywhere in upper and lower plate portions and an intermediate partition plate portion. Similarly, the front and rear faces of each of the first controller box body 7A and the second controller box body 7B are opened and ventilation holes are formed everywhere in upper and lower plate portions so that a structure of preferable ventilation property is formed in each controller box body.

In the disk array device 1 of this example, the first disk drive box body 4A and the second disk drive box body 4B are arranged above the first controller box body 7A and the second controller box body 7B within the disk array box body 2. Here, the first disk drive box body 4A and the second disk drive box body 4B are spaced and arranged at intervals greater than those of the first controller box body 7A and the second controller box body 7B. Thus, the flow of the cooling wind within the disk array box body 2 is smoothed by constructing the intervals of the first disk drive box body 4A and the second disk drive box body 4B so as to be greater than the intervals of the first controller box body 7A and the second controller box body 7B. Namely, the cooling wind flowed via the interiors of the first controller box body 7A and the second controller box body 7B and the cooling wind flowed via the interiors of the first disk drive box body 4A and the second disk drive box body 4B are joined and passed between the first disk drive box body 4A and the second disk drive box body 4B by the operation of a fan for exhaust described later. Therefore, the intervals of the first disk drive box body 4A and the second disk drive box body 4B are set to be greater than the intervals of the first controller box body 7A and the second controller box body 7B, and the passing roads of the cooling winds are sufficiently secured so that the cooling winds are smoothly flowed.

The front face side and the rear face side of the disk array box body 2 are opened. The plural disk drives 5 of the disk drive section 3, and the disk adapter board 8, the channel adapter board 9, the memory board 10 and the switch board 11 of the controller section 6 are exchanged from these opening faces.

A processor (SVP) 13 for management is mounted to this disk array device 1 as a means for managing the state within the device. This processor 13 for management is connected to the disk adapter board 8, the channel adapter board 9 and the memory board 10 through the switch board 11, and collects and manages information relating to the disk adapter board 8, the channel adapter board 9 and the memory board 10.

Two processors 13 for management are arranged and one processor 13A for management is used as a main device at all times, and the other processor 13B for management is used for emergency as a subdevice so that reliability is improved.

The processor 13 for management used here is greatly different from the general PC, and is a PC for industry specially customized and designed and manufactured for this disk array device. This PC for industry uses parts of high durability specification in its constructional parts so that the operating environment temperature is set to 40° C. or more and the operating time of five to seven years is realized.

No processor 13 for management constructed by such a PC for industry has a display and a keyboard arranged in the general PC. Therefore, in the disk array device of this example, a computer for output used to output management information managed by this processor 13 for management is arranged separately from the processor 13 for management. A notebook type PC 14 as a product sold at a market is used as this computer for output, and the management information outputted from the processor 13 for management is displayed in the display of this notebook type PC 14. Further, the disk array device is operated by inputting commands from a keyboard and a mouse section of this notebook type PC 14 to the processor for management.

Further, in the disk array device 1 of this example, plural fans 15 for exhaust are located above the first disk drive box body 4A and the second disk drive box body 4B and are arranged on the upper face of the disk array box body 2.

Figure 4:
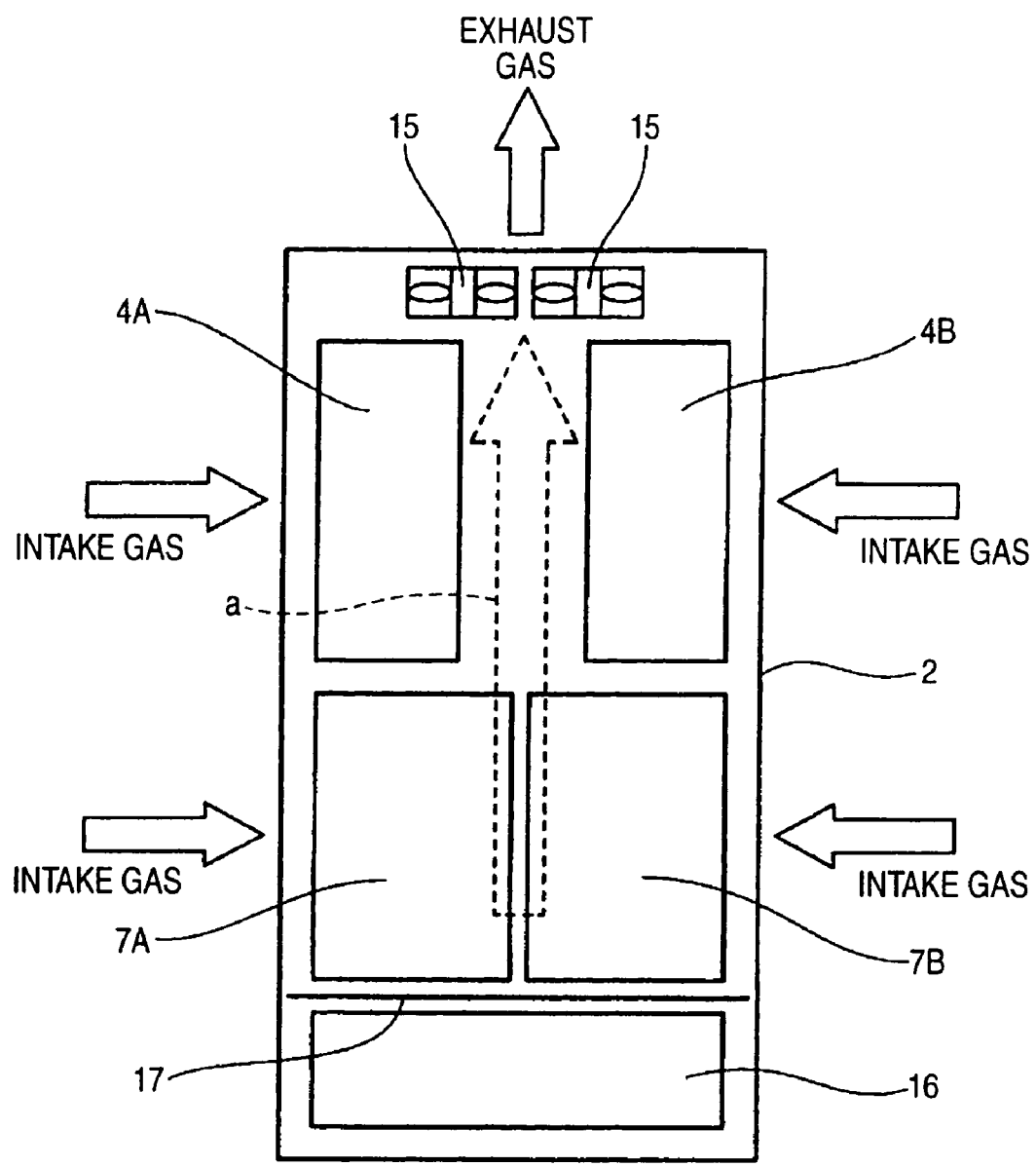
FIG. 4 is an explanatory view of the flow of a cooling wind.

This fan 15 for exhaust is used to exhaust the air within the disk array box body 2 and cool the interior of the disk array box body 2. Namely, when this fan 15 for exhaust is operated, the air sucked from the front face side and the rear face side of the disk array box body 2 becomes a ventilating wind and also becomes the flow a of a cooling wind within the disk array box body 2 via the interiors of the first disk drive box body 4A and the second disk drive box body 4B and the interiors of the first controller box body 7A and the second controller box body 7B as shown in FIG. 4. This air is then exhausted above the disk array box body 2 and the interior of the disk array box body 2 is effectively cooled by the ventilation of this cooling wind.

Further, in the disk array device 1 of this example, a power source device 16 is arranged in the lowermost portion of the disk array box body 2. This power source device 16 supplies a direct current voltage as driving electric power to the plural disk drives 5 of the disk drive section 3, the plural disk adapter boards 8, the plural channel adapter boards 9, the plural memory boards 10 and the plural switch boards 11 in the disk controller section 6, the processor 13 for management, the computer 14 for output and the fan 15 for exhaust.

A ventilation interrupting plate 17 for preventing the ventilating wind from the power source device 16 is arranged in the disk array box body 2 above this power source device 16. Namely, the first controller box body 7A and the second controller box body 7B are arranged above the power source device 16 through this ventilation interrupting plate 17 in the disk array box body 2. Thus, a structure for easily transmitting no heat of the power source device 16 to the sides of the first controller box body 7A and the second controller box body 7B is formed.

The disk array device 1 of this example has the following advantages by using a dedicated PC for industry in the managing processor 13 for managing the state within the device. Namely, the operating environment temperature of the PC for industry is set to 40° C. or more and is higher than that of the general PC. Therefore, reliability in the interior of the disk array box body 2 attaining high temperature is improved. Further, reliability relating to the operating time is also improved since the operating time is 5 to 7 years and is longer than that of the general PC. Further, in the disk array device of this example, it is sufficient to operate the notebook type PC 14 only when a maintenance worker sees the state of the disk array device by separating the processor 13 for management and the notebook type PC (computer for output) 14 used in the output of this processor 13. Accordingly, the notebook type PC sold at a market can be also used without the problem of the operating time. Further, when the notebook type PC is broken, the notebook type PC can be simply exchanged. Further, since the operating time of the PC for industry is set to a long time such as 5 to 7 years, no frequent maintenance exchange is caused and the influence of a model change can be minimized.

In particular, in the disk array device 1 of this example, an arranging structure considering the ventilation property within the disk array box body 2 is adopted in mounting the processor 13 for management and the notebook type PC 14 as a computer for the output of this processor 13.

Namely, the processor 13 (13A, 13B) for management is arranged in a longitudinal arranging state within the disk array box body 2 along the side face of the first disk drive box body 4A by utilizing the space between the first disk drive box body 4A, the second disk drive box body 4B and the disk array box body 2. Further, the notebook type PC 14 as a computer for the output of the processor 13 for management is arranged in the longitudinal arranging state along the side face of the second disk drive box body 4B. Here, the processor 13 for management is fixed and supported by the disk array box body 2 through an attaching plate 18 in a state in which two processors 13 for management are overlapped. The notebook type PC 14 is arranged so as to be pulled out with respect to the disk array box body 2 through a pulling-out mechanism 19.

This pulling-out mechanism 19 of the notebook type PC performs an operation for pulling the notebook type PC 14 out of the arranging position of the side face of the second disk drive box body 4B and further rotating this notebook type PC 14 on the second disk drive box body 4B side so as to use this notebook type PC 14.

The detailed construction of this pulling-out mechanism is shown in FIGS. 5 to 8. Namely, this pulling-out mechanism 19 is constructed by a pair of upper and lower slide rails 20 horizontally fixed to the disk array box body 2, a frame body 21 fixed to a movable side rail of this slide rail 20, and a pedestal plate 23 rotatably attached to this frame body 21 in the direction perpendicular to the slide direction of the slide rail with a hinge portion 22 as a fulcrum. The notebook type PC 14 as a computer for the output of the processor for management is placed and supported in a fixing state on this pedestal plate 23. This pulling-out mechanism 19 may be also set to a simple structure in which only one slide rail 20 on the lower side is set and the pedestal plate 23 is rotatably attached to this one slide rail 20.

Figure 5:
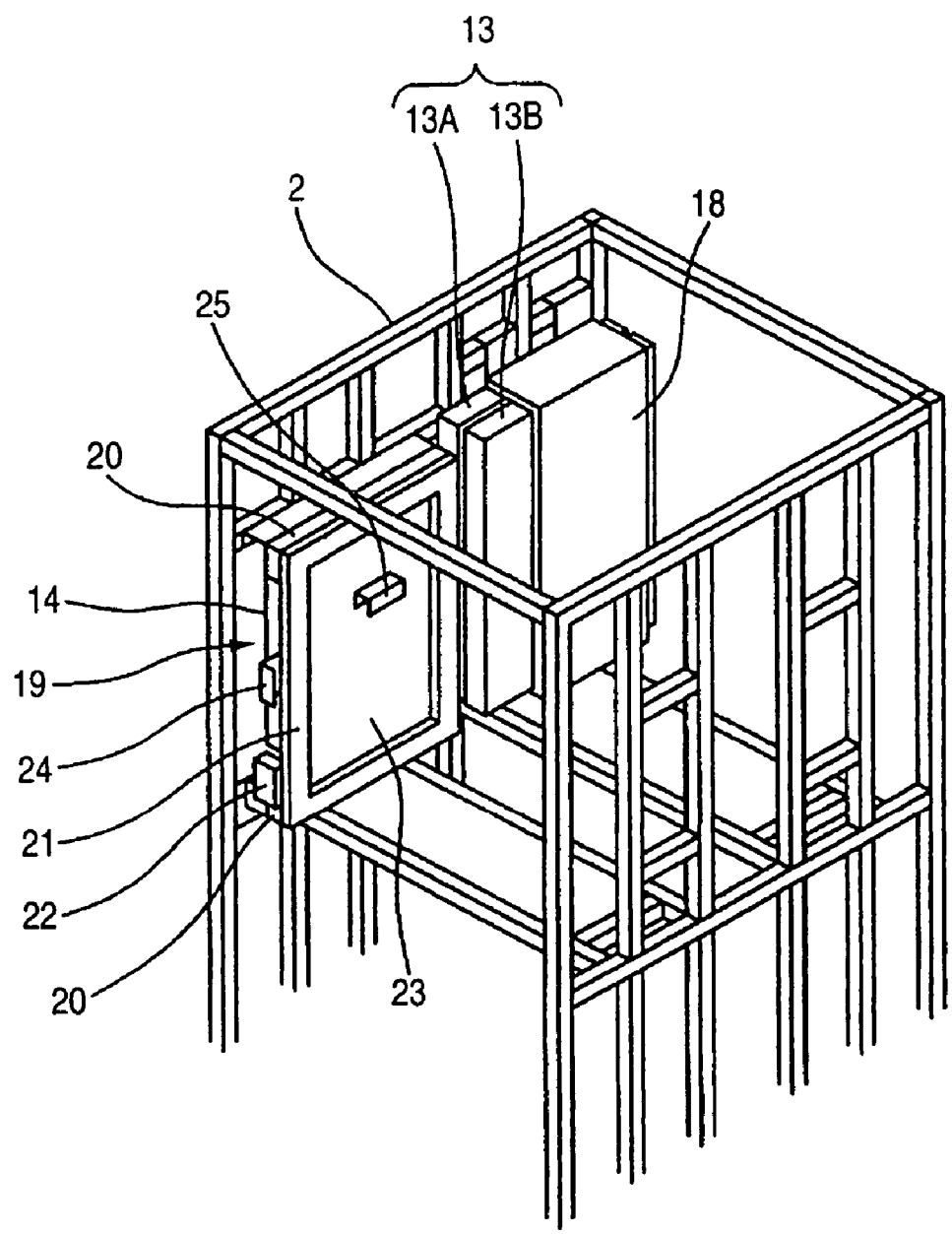
FIG. 5 is a perspective view showing the construction of a pulling-out mechanism in the storing state of a notebook type PC.
Figure 6:
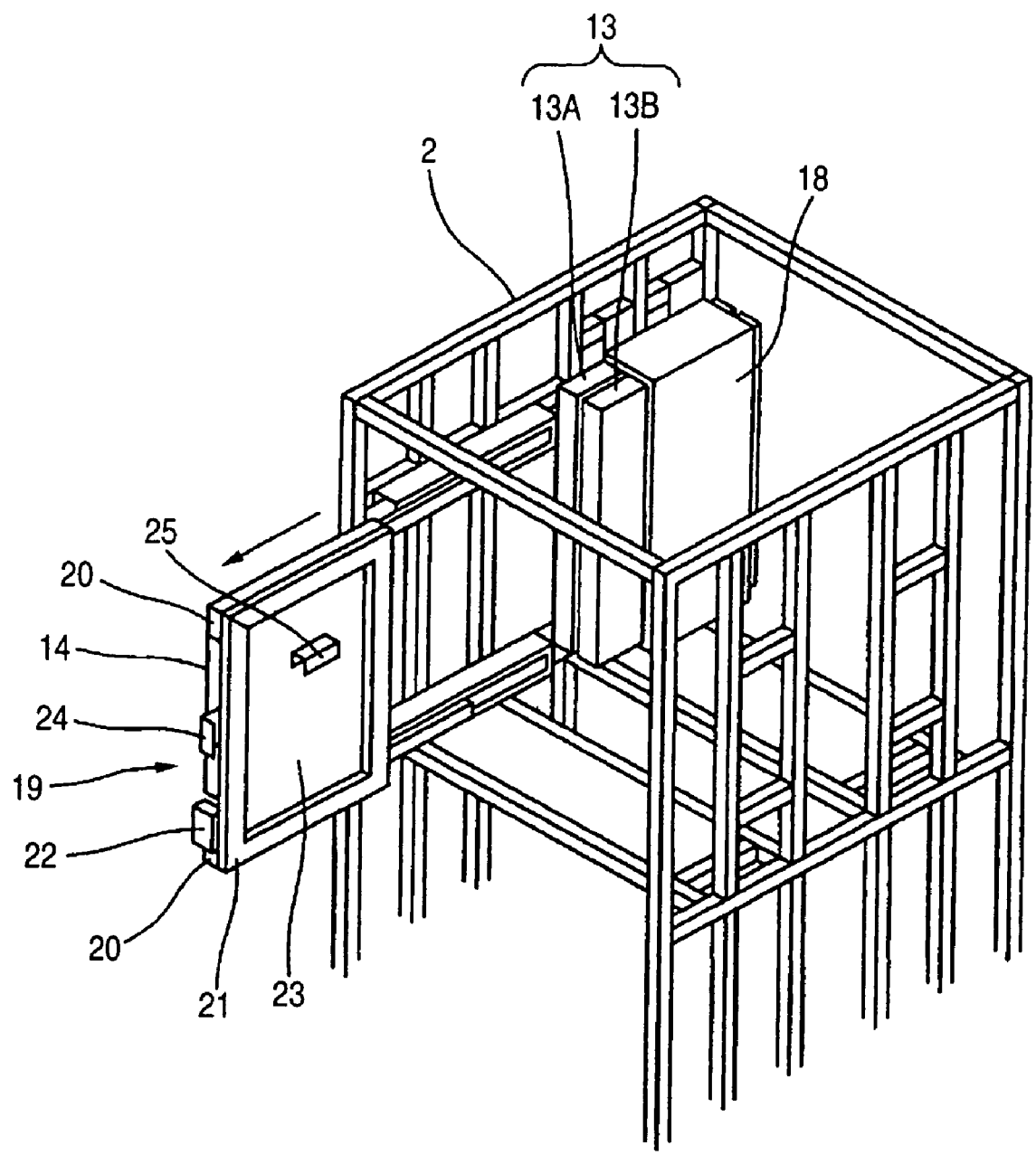
FIG. 6 is a perspective view of the pulling-out mechanism showing a pulling-out state.
Figure 7:
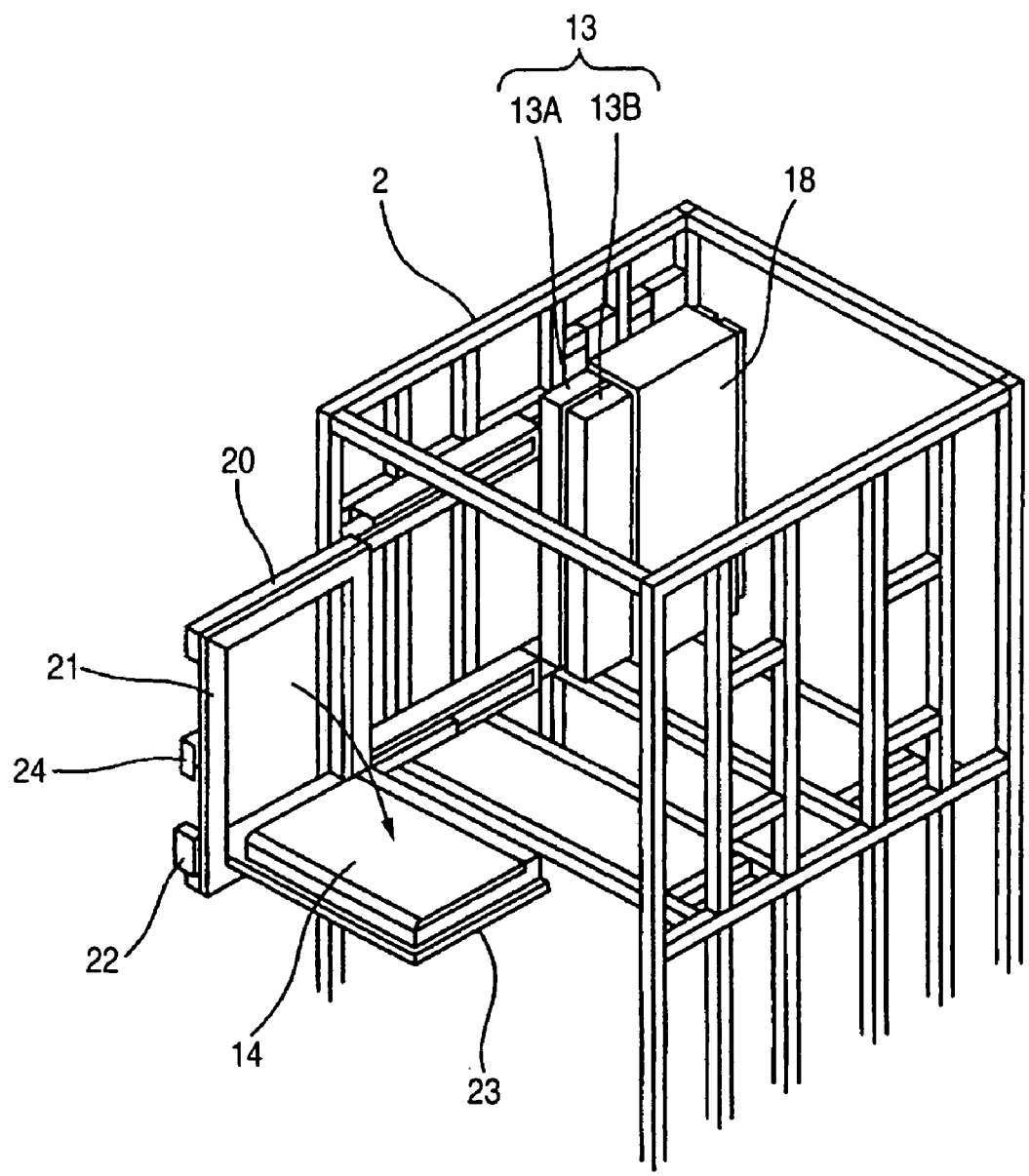
FIG. 7 is a perspective view of the pulling-out mechanism showing a rotating state.

In the storing state shown in FIG. 5, the notebook type PC 14 is stored and arranged in the longitudinal arranging state. A handle 24 arranged in the front edge portion of the frame body 21 is then gripped from this state and is pulled on this side so that the notebook type PC 14 is pulled out of the disk array box body 2 by the slide of the slide rail 20 as shown in FIG. 6. Thereafter, a handle 25 arranged on the rear face side of the pedestal plate 23 is gripped and the pedestal plate 23 is brought down and is rotated until the forward horizontal position of the disk array box body 2 as shown in FIG. 7 so that the notebook type PC 14 is rotated together with the pedestal plate 23 and attains a usable state in front of the disk array box body 2.

Figure 8:
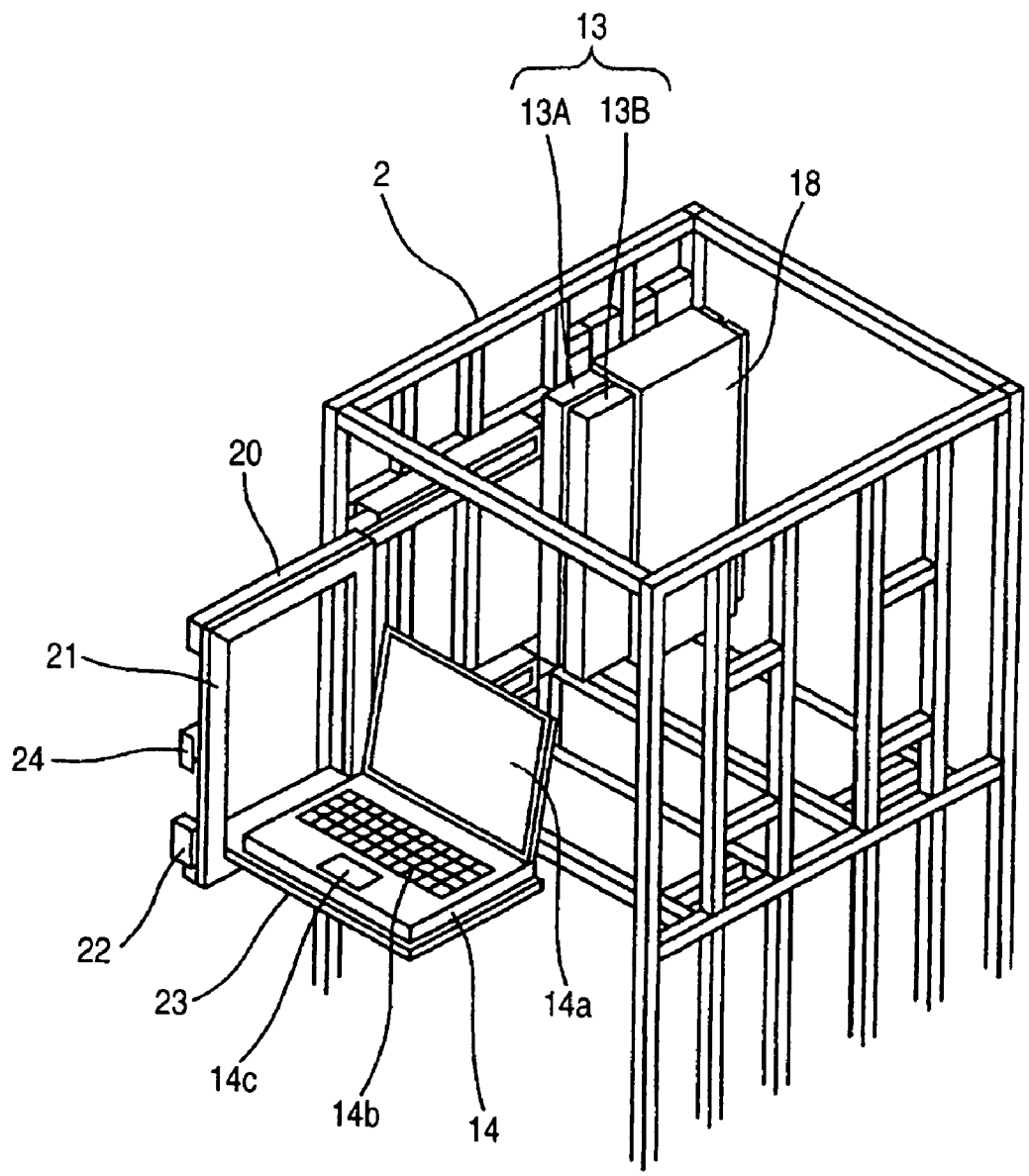
FIG. 8 is a perspective view of the pulling-out mechanism showing a state at its using time.

As shown in FIG. 8, a worker opens the display 14a of the notebook type PC 14 from this state, and turns on the power source of the notebook type PC 14 and makes the display 14a display management information outputted from the processor 13 for management. Further, the disk array device is operated by inputting commands to the processor 13 for management from the keyboard 14b and the mouse section 14c of this notebook type PC 14. After the notebook type PC 14 is used, this notebook type PC 14 is again returned to the storing state of FIG. 5 and is set to the normal longitudinal arranging state.

Thus, in the disk array device 1 of this example, the processor 13 for management is arranged in the longitudinal arranging state along the side face of the first disk drive box body 4A. The notebook type PC 14 as a computer for output is arranged in the longitudinal arranging state along the side face of the second disk drive box body 4B. Space saving within the disk array box body 2 can be realized by such an arranging construction. Further, no processor 13 for management prevents the interval for ventilation between the plural disk drives 5 within the first disk drive box body 4A, and no notebook type PC 14 prevents the interval for ventilation between the plural disk drives 5 within the second disk drive box body 4B. Further, the processor 13 for management and the notebook type PC 14 do not prevent the intervals for ventilation between the respective boards 8, 9, 10, 11 within the first controller box body 7A and the second controller box body 7B. Accordingly, the processor 13 for management and the notebook type PC 14 do not prevent the flows of a cooling wind passing through the interiors of the first disk drive box body 4A and the second disk drive box body 4B, and a cooling wind passing through the interiors of the first controller box body 7A and the second controller box body 7B. Therefore, the processor 13 for management and the notebook type PC 14 do not have a bad influence on the temperature environment within the disk array device.

When the notebook type PC 14 is used, the disk array device 1 of this example is constructed such that the notebook type PC 14 is pulled out of the disk array box body 2 and is further rotated and used as mentioned above. Accordingly, a maintenance worker can make a work while the maintenance worker sees the disk array device on the front face. Further, after the notebook type PC 14 is used, the notebook type PC 14 can be simply stored. Therefore, the maintenance worker can easily make the work and using convenience is good.

The wiring of a peripheral portion of the processor 13 for management in the disk array device of this example will next be explained.

Figure 9:
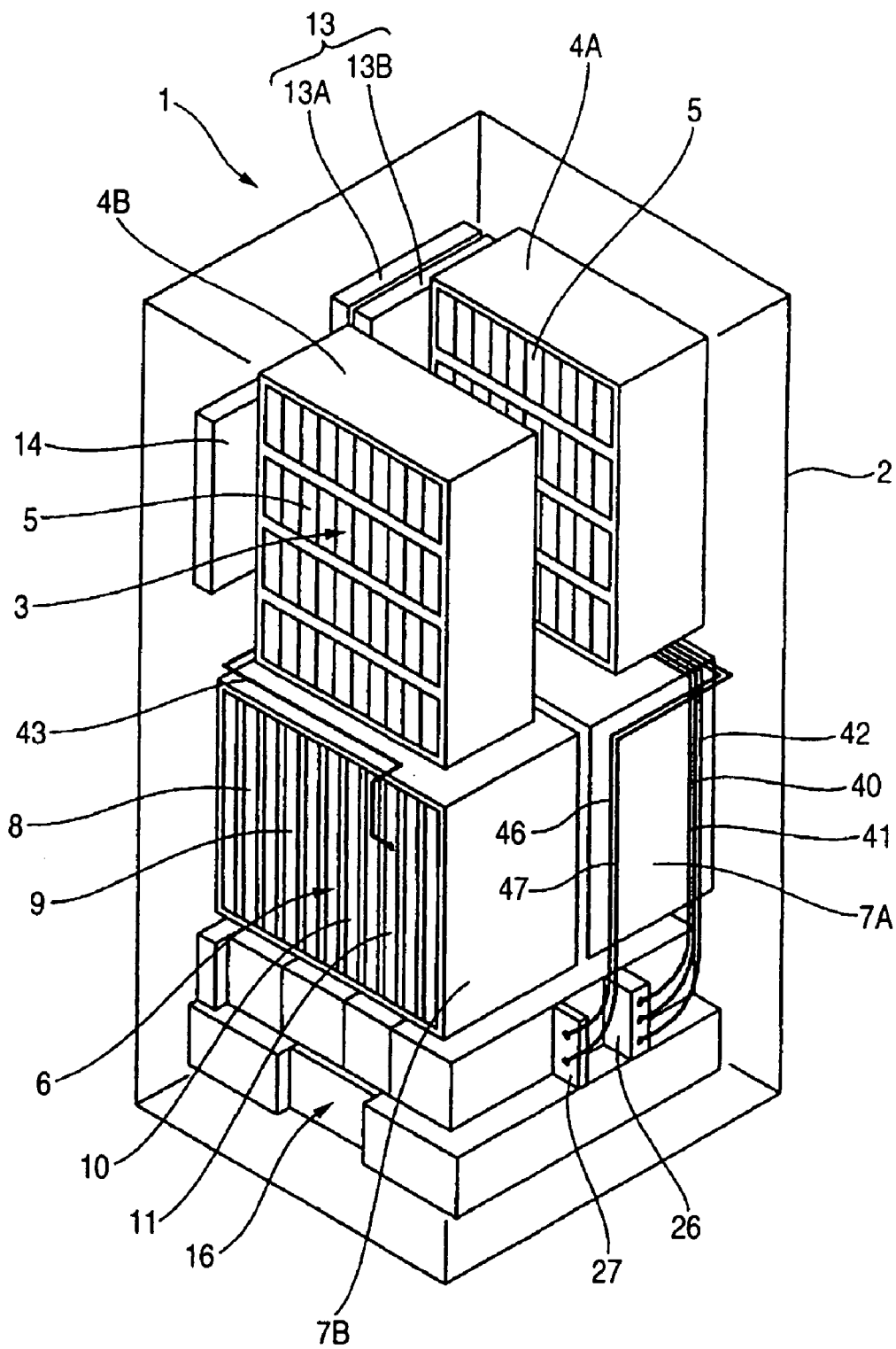
FIG. 9 is a perspective view in which wiring relating to a processor for management is seen from the front face side.
Figure 10:
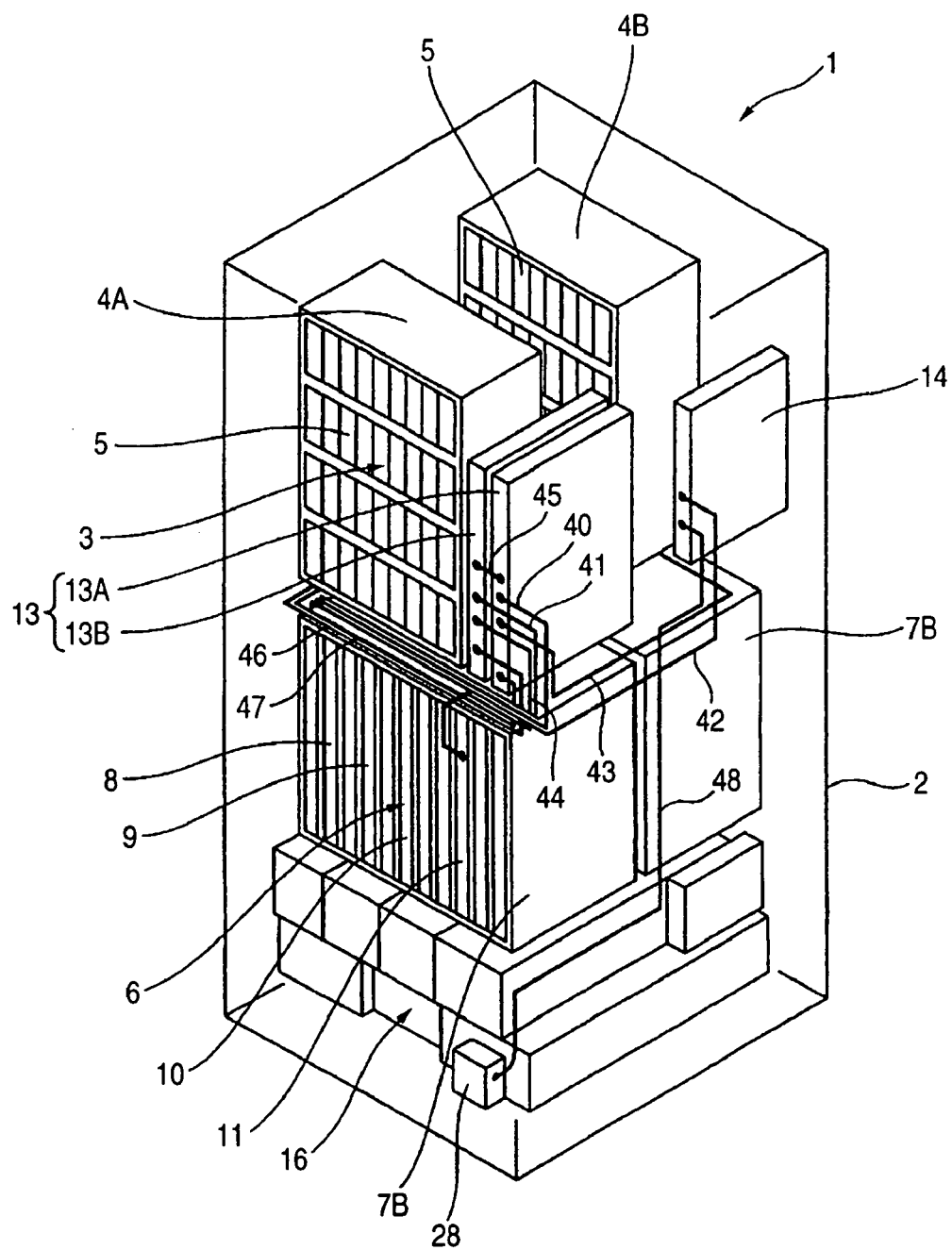
FIG. 10 is a perspective view in which the wiring is seen from the rear face side.
Figure 11:
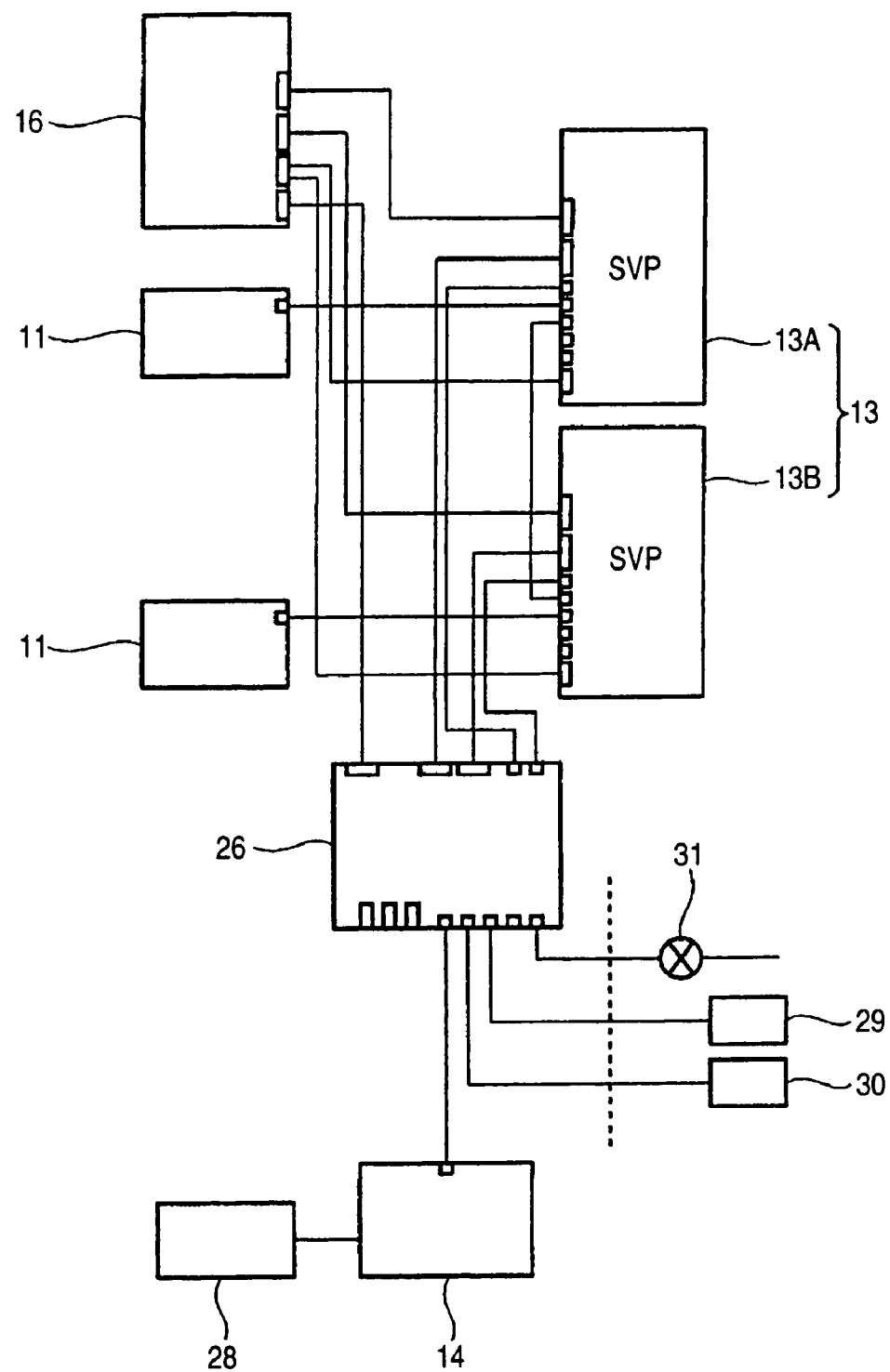
FIG. 11 is a connecting view of the wiring.

FIG. 9 is a perspective view in which the wiring relating to the processor for management is seen from the front face side in the disk array device of this example. FIG. 10 is a perspective view in which this wiring is seen from the rear face side. FIG. 11 is a connecting view of this wiring.

In the disk array device of this example, all the connections of a data transmitting-receiving system relating to the processor 13 for management are set to LAN (local area network) connection. The two processors 13A, 13B for management are LAN-connected to the notebook type PC 14 as a computer for output through a relay 26 arranged in the lower portion of the disk array box body 2. Here, the two processors 13A, 13B for management and the relay 26 are respectively connected by LAN cables 40, 41. The relay 26 and the notebook type PC 14 are connected by a LAN cable 42. The two processors 13A, 13B for management are respectively connected to the switch board 11 of the disk controller section by LAN cables 43, 44. Further, the two processors 13A, 13B for management are connected to each other by a LAN cable 45.

On the other hand, the two processors 13A, 13B for management are respectively connected to an output board 27 of the power source device 16 by power cables 46, 47 as power source system connection. The notebook type PC 14 is connected to a breaker box 28 for PC arranged in the power source device 16 by a power cable 48.

Here, LAN cables 40, 41, 42, 43, 44 and power cables 46, 47, 48 are wired along the external surfaces of the first controller box body 7A and the second controller box body 7B so as not to prevent the flows of the cooling winds passing through the interiors of the first controller box body 7A and the second controller box body 7B. Further, the LAN cables 40, 41, 42, 43, 44 and the power cables 46, 47, 48 are wired as convergently as possible so as to minimize the influence on the cooling wind passing through the interior of the disk array box body 2.

Further, in this construction, the relay 26 and the output board 27 of the power source device are arranged on the side opposed to the processor 13 for management within the disk array box body 2. Namely, as can be clearly seen from FIG. 9, the processor 13 for management is arranged on the upper left-hand side seen from the front face side within the disk array box body 2. In contrast to this, the relay 26 and the output board 27 of the power source device are arranged on the lower right-hand side. In accordance with such an arrangement construction, the LAN cables 40, 41, 42, 43, 44 and the power cables 46, 47, 48 can be dispersively wired on both sides without being concentrated onto one side of the disk array box body 2 so that the influence on the cooling wind passing through the interior of the disk array box body 2 can be minimized. The relay 26 and the output board 27 of the power source device may be also arranged on the same side as the processor 13 for management. In this case, since the lengths of the LAN cables 40, 41, 42, 43, 44 and the power cables 46, 47, 48 can be shortened, there is an advantage in that complicatedness of the wiring can be reduced.

Further, in this construction, since the relay 26 and the output board 27 of the power source device are arranged in proximity to each other, it is possible to efficiently make the connecting work of this relay 26, the LAN cables 40, 41, 42 with respect to the output board 27, and the power cables 46, 47. Further, since the relay 26 is arranged in the position proximate to the output board 27 of the power source device 16 arranged in the lowermost portion of the disk array box body 2, no relay 26 prevents the cooling wind flowed into the disk array box body 2 between the processor 13 for management and the notebook type PC 14 arranged on the side opposed to this relay 26. The relay 26 may be also arranged in a position separated from the output board 27 of the power source device 16. In this case, for example, no relay 26 prevents the cooling wind flowed into the disk array box body 2 by arranging the relay 26 on the side faces of the controller box bodies 7A, 7B or the side faces of the disk drive box bodies 4A, 4B.

Further, since wiring can be simply performed in the disk array device of this example by setting the connection of the processor 13 for management and the notebook type PC 14 to the LAN connection, there is an advantage in that the wiring work is easily made at the assembling time and the repairing time of the disk array device.

Further, since the processor 13 for management and the notebook type PC 14 are connected via the LAN, the connection from the exterior can be easily realized. In this case, the processor 13 for management is connected to plural external LANs through hubs 29, 30 for an external LAN in the exterior of the disk array device, and can output and manage management information of the disk array device in an output terminal at an external strongpoint. Further, the management information of the disk array device can be also notified to the external strongpoint through a telephone line (ISDN line) 31 by building a modem into the processor for management.

In the disk array device of this example, the LAN cable is used in the LAN connection relating to the processor 13 for management, but this LAN connection may be also constructed by wireless LAN. In this case, since the wiring within the disk array box body 2 can be further omitted, complicatedness of the wiring can be greatly dissolved.

In the disk array device of this example, the notebook type PC 14 is connected to the processor 13 for management at all times, but can be also constructed so as to be detachably attached to the processor 13 for management. In this case, the notebook type PC 14 is normally detached and a worker connects the notebook type PC 14 to the processor 13 for management by the LAN only at the maintenance working time. Thus, since it is not necessary to mount the notebook type PC into the disk array box body at high temperature, there is an effect in that life of the notebook type PC can be extended. Further, in this case, there is an advantage in which cost of the disk array device is reduced by optionally setting the notebook type PC.

A second embodiment of the present invention will be subsequently explained.

Figure 12:
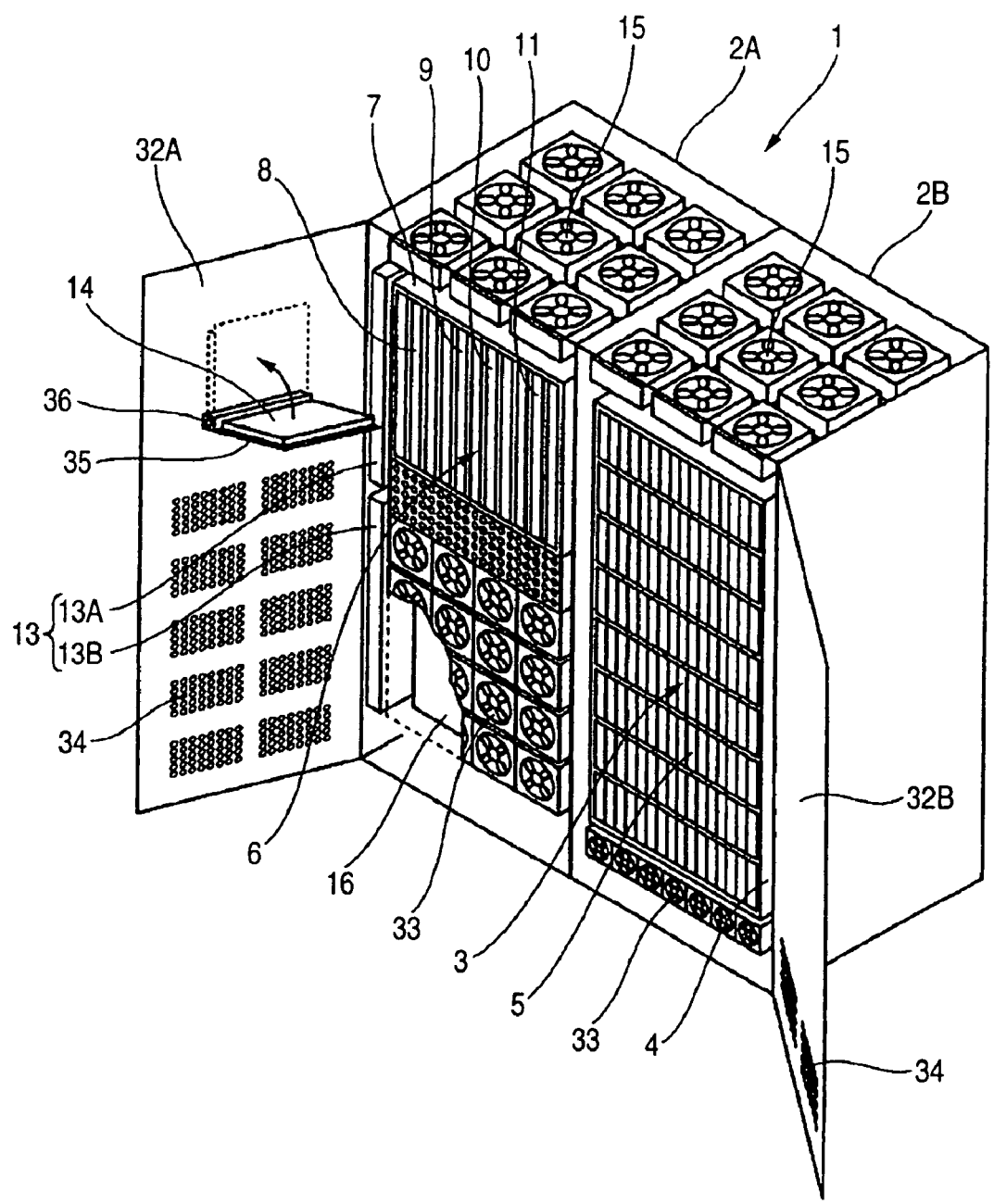
FIG. 12 is a perspective view in which the disk array device of a second embodiment of the present invention is seen from the front face side.

FIG. 12 is a perspective view showing a disk array device of the second embodiment of the present invention.

The disk array device 1 shown in this example is constructed by arranging two disk array box bodies, i.e., a first disk array box body 2A and a second disk array box body 2B. The first disk array box body 2A and the second disk array box body 2B are opened on the front face side, and front doors 32A and 32B for opening and closing these opening faces are attached. Each of these front doors 32A and 32B is a door of a rotary type symmetrically opened leftward and rightward.

The first disk array box body 2A has a disk controller section 6 and the second disk array box body 2B has a disk unit section 3. The disk controller section 6 of the first disk array box body 2A is constructed by spacing and arranging a disk adapter board 8, a channel adapter board 9, a memory board 10 and a switchboard 11 in the plural at intervals for ventilation within a controller box body 7. The disk unit section 3 of the second disk array box body 2B is constructed by spacing plural disk drives 5 at intervals for ventilation and arranging the plural disk drives 5 in a matrix shape within a disk drive box body 4. The number of second disk array box bodies 2B having this disk unit section 3 can be increased to a plural number.

The disk drive box body 4 is opened on its front and rear faces, and ventilation holes are formed everywhere in upper and lower plate portions and an intermediate partition plate portion. Similarly, the controller box body 7 is also opened on its front and rear faces, and ventilation holes are formed everywhere in upper and lower plate portions. Thus, a structure of preferable ventilation property is formed in each of the disk drive box body 4 and the controller box body 7.

The power source device 16 (a main power source device 16A and a battery 16B for an auxiliary) is arranged in the lower portion of the first disk array box body 2A. The controller box body 7 is arranged above this power source device 16, and plural fans 15 for exhaust are arranged on the upper face of the first disk array box body 2A above this controller box body 7. Further, plural fans 33 for intake gas are arranged in the first disk array box body 2A so as to cover the forward portion of the power source device 16. Many ventilation holes 34 are arranged in the front door 32A correspondingly to this fan 33 for intake gas.

Figure 13:
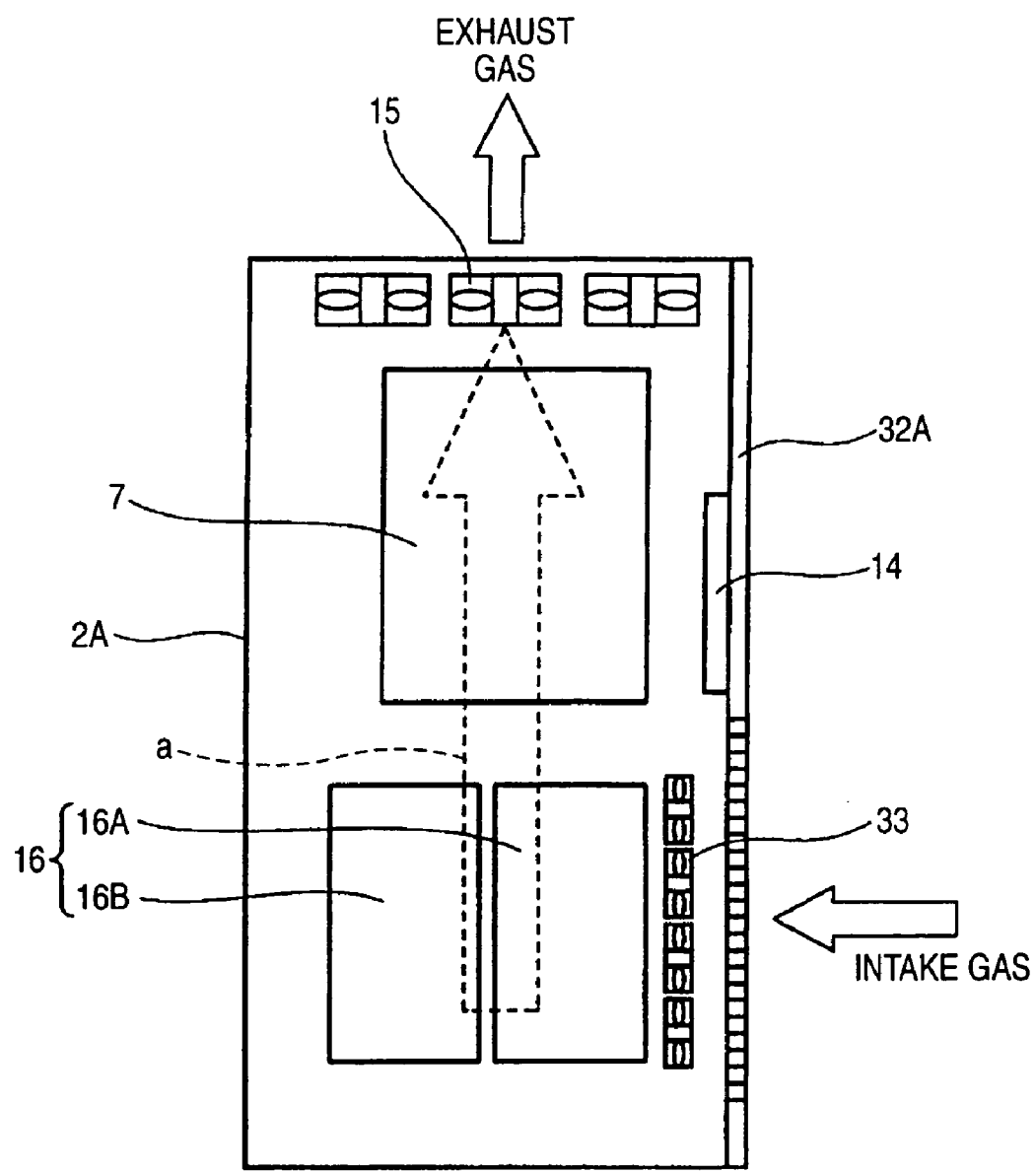
FIG. 13 is an explanatory view of the flow of a cooling wind.

In this first disk array box body 2A, as shown in FIG. 13, the air sucked from the front face side by the fan 33 for intake gas becomes the flow a of a cooling wind via the power source device 16 and passes through the interior of the controller box body 7. Thereafter, the air is exhausted above the first disk array box body 2A by the fan 15 for exhaust and the interior of the first disk array box body 2A is effectively cooled by the ventilation of this cooling wind.

In contrast to this, plural fans 33 for intake gas are arranged in the lowermost portion of the second disk array box body 2B, and the disk drive box body 4 is arranged above this fan 33 for intake gas. Further, plural fans 15 for exhaust are arranged on the upper face of the second disk array box body 2B above this disk drive box body 4. Many ventilation holes 34 are arranged in the front door 32B correspondingly to the fan 33 for intake gas arranged in this second disk array box body 2B.

In this second disk array box body 2B, the air sucked from the front face side by the fan 33 for intake gas becomes the flow of a cooling wind and passes through the interior of the disk drive box body 4. Thereafter, the air is exhausted above the second disk array box body 2B by the fan 15 for exhaust, and the interior of the second disk array box body 2B is effectively cooled by the ventilation of this cooling wind.

In the disk array device of this example constructed in this way, the processor 13 for management is mounted by utilizing the space located between the controller box body 7, the power source device 16 and the first disk array box body 2A within the first disk array box body 2A. Namely, in this case, the processor 13 for management is arranged in a longitudinal arranging state in which the two processors 13A, 13B for management are vertically arranged along the side faces of the controller box body 7 and the power source device 16.

In contrast to this, the notebook type PC 14 as a computer for output in the processor 13 for management is mounted to the front door 32A of the first disk array box body 2A. Here, the notebook type PC 14 is placed and fixed onto a pedestal plate 35 rotatably attached to the rear face side of the front door 32A. The pedestal plate 35 is rotated in the vertical direction with a support shaft 36 as a center. The notebook type PC 14 is stored and arranged in the longitudinal arranging state along the rear face side of the front door 32A in a state in which this pedestal plate 35 is perpendicular. The notebook type PC 14 is normally stored in the longitudinal arranging state on the rear face side of the front door 32A in the closing state of the front door 32A. At the maintenance working time, the notebook type PC 14 is set to a usable state by horizontally bringing-down and rotating the pedestal plate 35 in the opening state of the front door 32A.

In the disk array device of this example, it is necessary to set the arranging position of the notebook type PC 14 to the unblocking position of the ventilation hole 34 of the front door 32A.

Thus, the disk array device of this example is constructed such that the processor 13 for management is arranged in the longitudinal arranging state along the side faces of the controller box body 7 and the power source device 16 in the first disk array box body 2A. Accordingly, no processor 13 for management prevents the intervals for ventilation between the disk adapter board 8, the channel adapter board 9, the memory board 10 and the switch board 11 within the controller box body 7, and also prevents the ventilation near the power source device 16. Further, the notebook type PC 14 as a computer for output is arranged on the rear face side of the front door 32A so as to attain the storing state of the longitudinal arrangement. Accordingly, no notebook type PC 14 prevents the intervals for ventilation between the disk adapter board 8, the channel adapter board 9, the memory board 10 and the switch board 11 within the controller box body 7, and also prevents the ventilation near the power source device 16. Hence, since the processor 13 for management and the notebook type PC 14 do not prevent the flow of the cooling wind passing through the interior of the first disk array box body 2A, the processor 13 for management and the notebook type PC 14 have no bad influence on the temperature environment within the disk array device.

Figure 14:
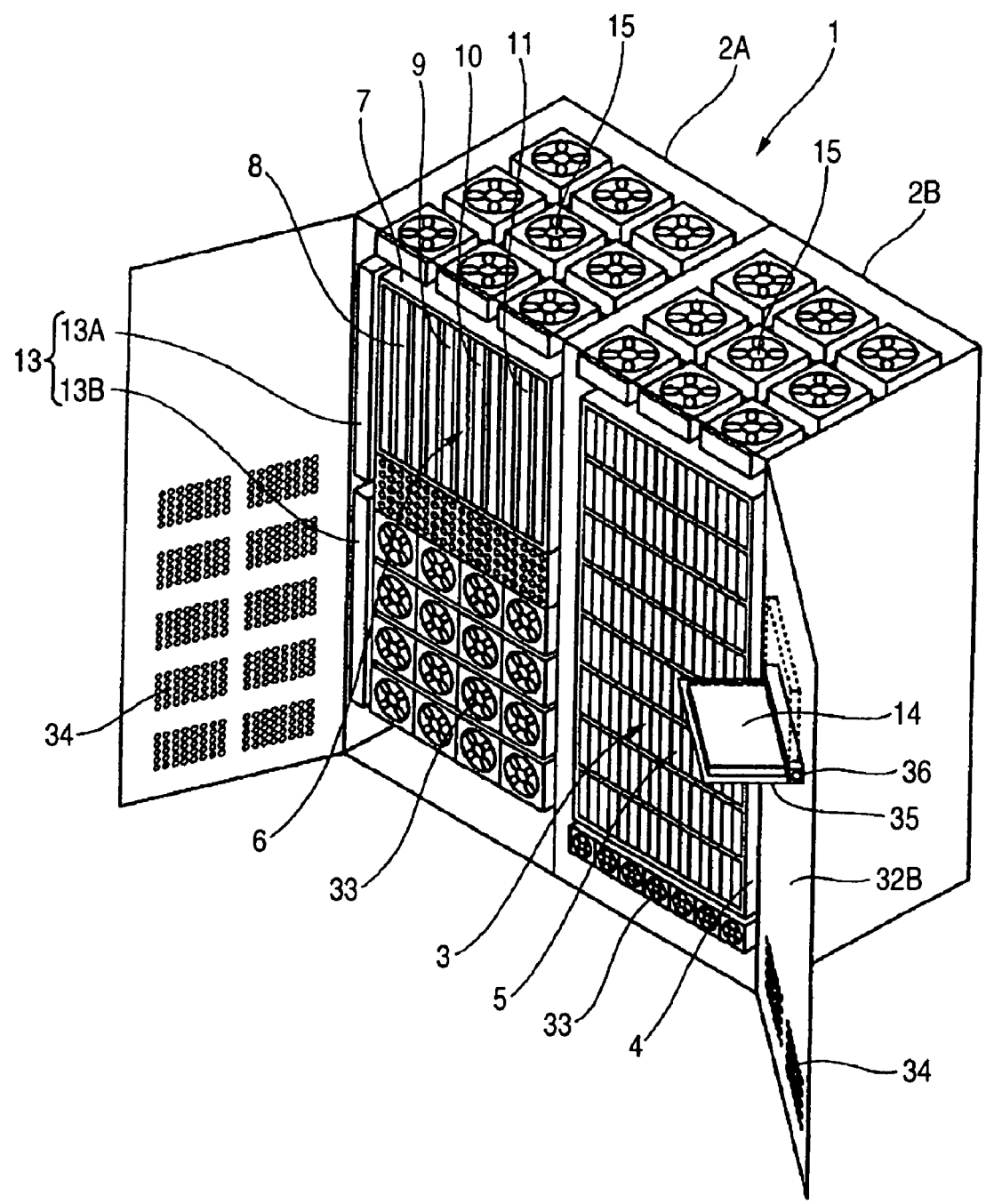
FIG. 14 is a view of another arrangement example of the notebook type PC.

The wiring of a peripheral portion of the processor 13 for management in the disk array device of this example is similar to that in the above first embodiment. Here, the processor 13 for management and the notebook type PC 14 are connected by LAN having simple wiring. Therefore, the notebook type PC 14 can be easily arranged even in a position separated from the processor 13 for management. For example, as shown in FIG. 14, the notebook type PC 14 can be also arranged in the front door 32B of the second disk array box body 2B side.

Figure 15:
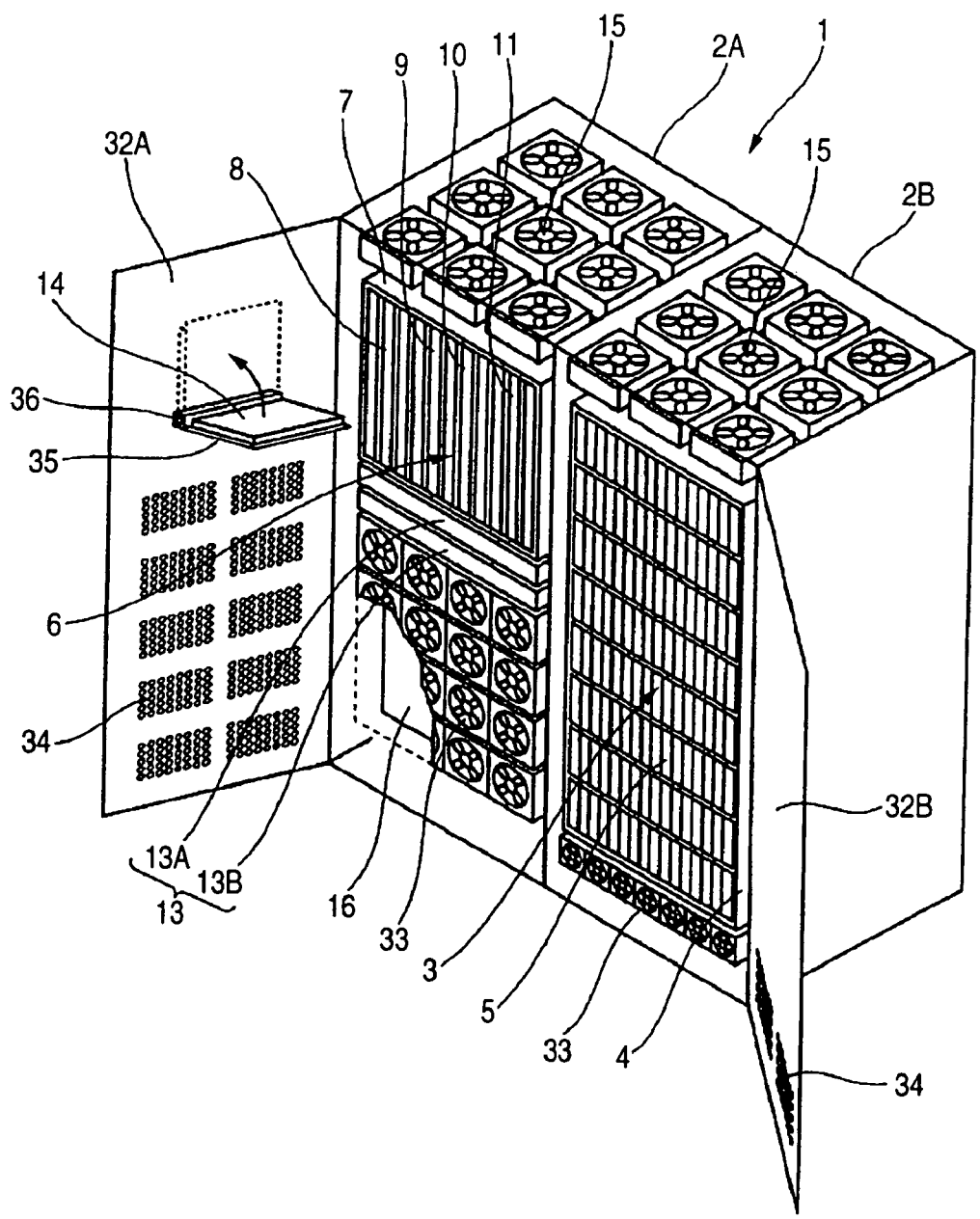
FIG. 15 is a view of another arrangement example of the processor for management.

FIG. 15 shows another arrangement example of the processor for management.

Figure 16:
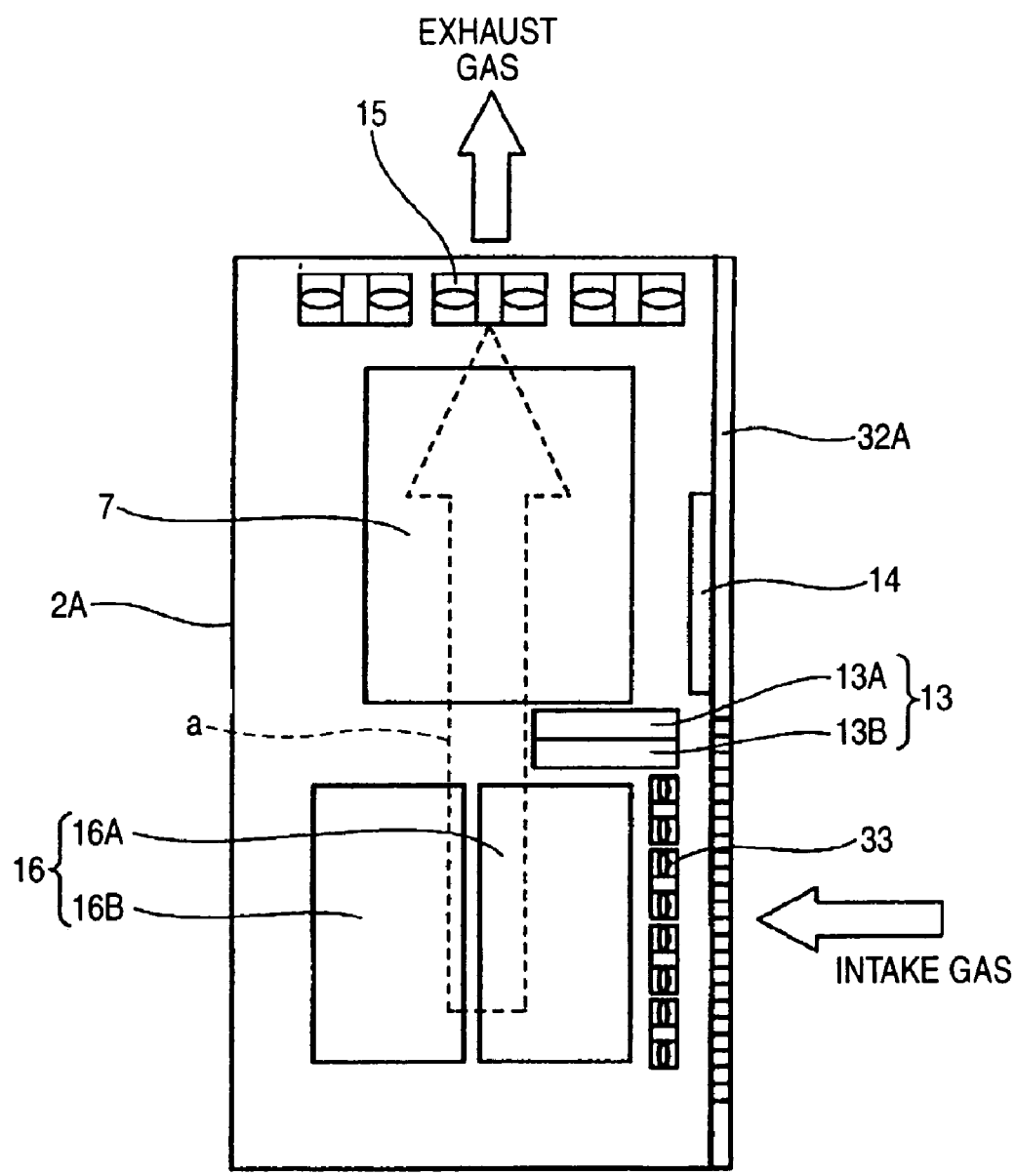
FIG. 16 is an explanatory view of the flow of the cooling wind.

In this example, the processor 13 for management is arranged in a transversal arranging state in the central portion within the first disk array box body 2A. Here, as shown in FIG. 16, the processor 13 for management is arranged in the vertical overlapping state of the two processors 13A, 13B for management in the space between the power source device 16 and the controller box body 7. In this case, the processor 13 for management is arranged in the forward portion dislocated from the central portion of the flow of a cooling wind so as not to prevent the flow a of the cooling wind within the first disk array box body 2A.

Further, in this example, it is desirable to secure the ventilation property by forming holes for ventilation on the upper and lower faces of the box body of the processor 13 for management so as not to prevent the flow of the cooling wind.

Figure 17:
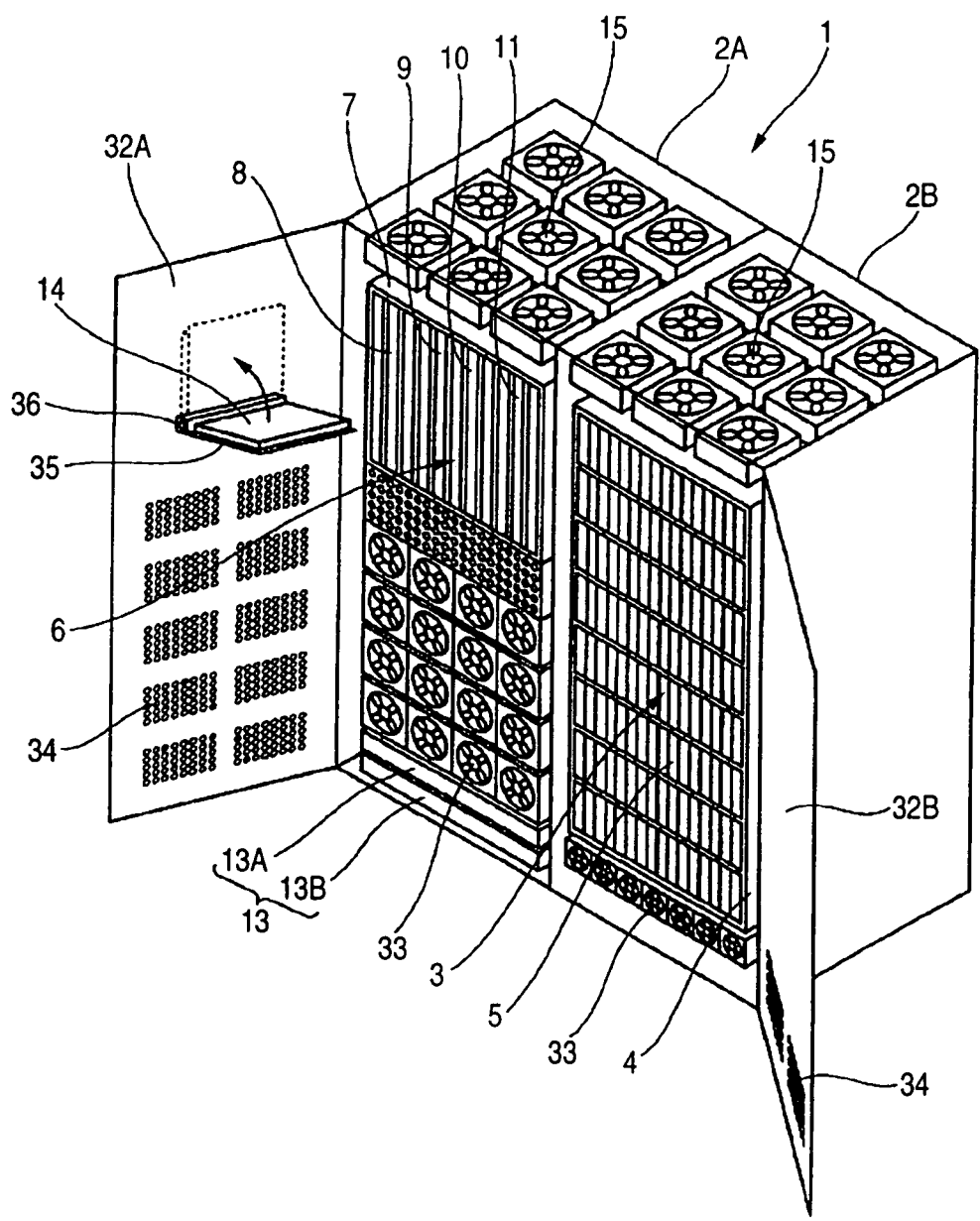
FIG. 17 is a view of still another arrangement example of the processor for management.

FIG. 17 shows still another arrangement example of the processor for management.

Figure 18:
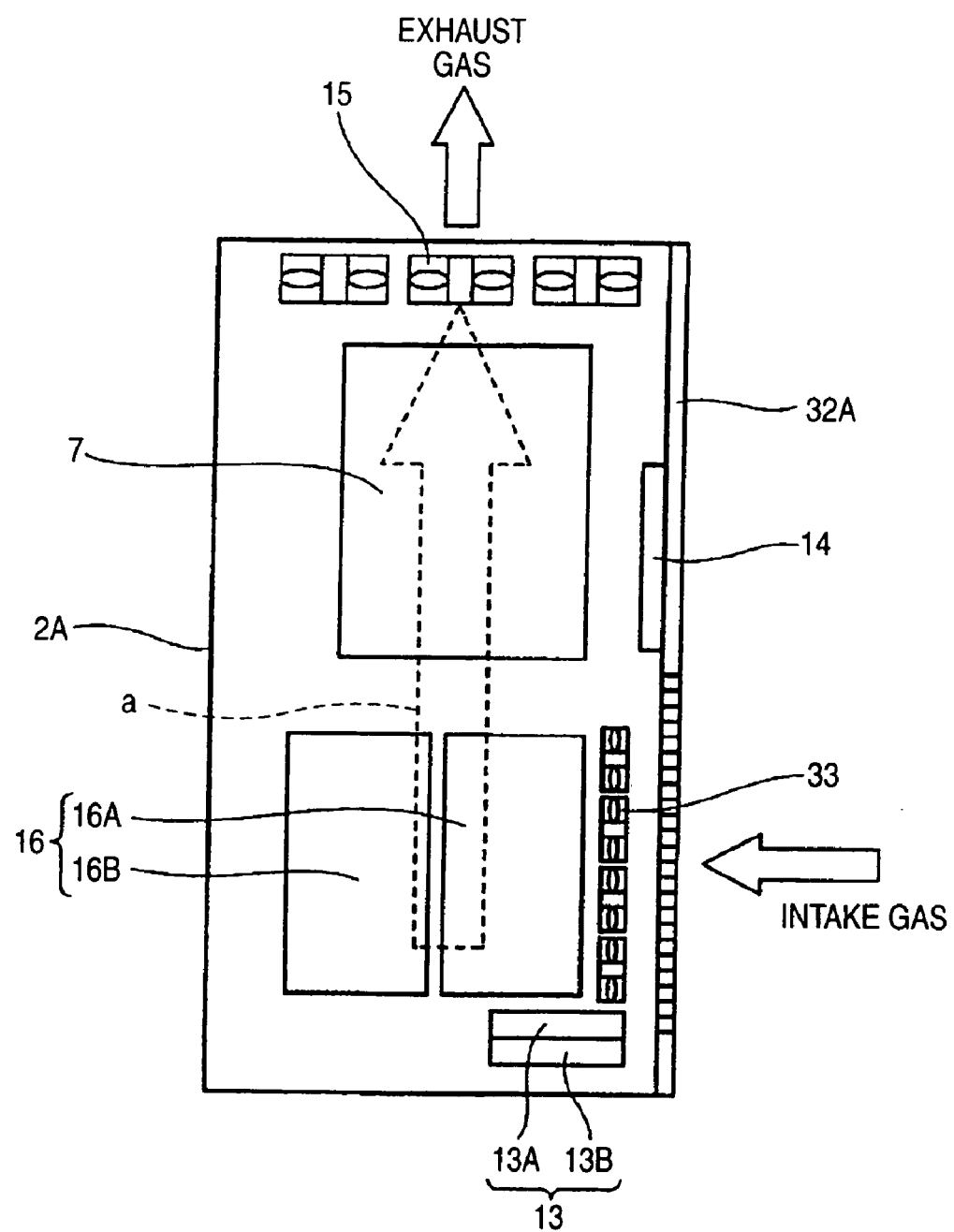
FIG. 18 is an explanatory view of the flow of the cooling wind.

In this example, the processor 13 for management is arranged in the transversal arranging state in the lowermost portion within the first disk array box body 2A. As shown in FIG. 18, the processor 13 for management is here arranged in the vertical overlapping state of the two processors 13A, 13B for management in the space of the lower side of the power source device 16. In this case, since no processor 13 for management prevents the flow a of a cooling wind within the first disk array box body 2A, this arrangement is most effective.

As mentioned above, the embodiments of the present invention have been explained, but the present invention is not limited to these embodiments. In the present invention, various kinds of other constructions can be naturally adopted without departing from the features of the present invention.

What is claimed:

1. A disk array device comprising:
   a disk array box body for arranging a box body therein;
   a first disk drive box body in which plural disk drives for storing data are spaced at intervals for ventilation and are arranged in a matrix shape;
   a second disk drive box body in which plural disk drives for storing data are spaced at intervals for ventilation and are arranged in a matrix shape;
   a controller box body constructed by arranging plural disk adapter boards for controlling the writing or reading operation of data with respect to the plural disk drives within said first disk drive box body and the plural disk drives within said second disk drive box body, and plural host adapter boards connected to a host device and receiving data from said host device, such that said plural disk adapter boards and said plural host adapter boards are spaced and arranged at intervals for ventilation;
   a processor for management constructed by a PC for industry connected to said plural disk adapter boards, and said plural host adapter boards within said controller box body, and collecting and managing management information relating to said plural disk adapter boards, and said plural host adapter boards and said plural memory boards;
   a computer for output used to output said management information managed by said processor for management;
   a fan for exhaust for exhausting a ventilating wind flowed via the interior of said controller box body and a ventilating wind flowed via the interiors of said first disk drive box body and said second disk drive box body to the exterior of said disk array box body; and
   a power source device for supplying electric power to the plural disk drives within said first disk drive box body, the plural disk drives within said second disk drive box body, said plural disk adapter boards and said plural host adapter boards within said controller box body, said processor for management, said computer for output and said fan for exhaust;
   wherein said disk array box body is constructed such that said controller box body is arranged above said power source device through a ventilation interrupting plate for preventing the ventilating wind from said power source device;
   said first disk drive box body and said second disk drive box body are arranged above said controller box body by interposing a flow path for passing the ventilating wind flowed via the interior of said controller box body between said first disk drive box body and said second disk drive box body;
   said processor for management is arranged on the side face of said first disk drive box body so as not to prevent the intervals for ventilation between the plural disk drives within said first disk drive box body;
   said computer for output is arranged on the side face of said second disk drive box body so as to be pulled out such that no intervals for ventilation between the plural disk drives within said second disk drive box body are prevented;
   said fan for exhaust is arranged above said first disk drive box body and said second disk drive box body; and
   said computer for output is pulled out of said disk array box body and is rotated and utilized on said second disk drive box body side when said management information is outputted and utilized.

2. The disk array device according to claim 1, wherein a plurality of said processors for management are arranged.

3. The disk array device according to claim 1, wherein said computer for output is constructed by a notebook type PC.

4. The disk array device according to claim 1, wherein said processor for management and said computer for output are connected by LAN.

5. The disk array device according to claim 1, wherein said computer for output is constructed so as to be detachably attached to said processor for management.

6. A disk array device comprising:
   a disk array box body for arranging a box body therein;
   a disk drive box body in which plural disk drives for storing data are spaced at intervals for ventilation and are arranged in a matrix shape;
   a controller box body constructed by arranging plural disk adapter boards for controlling the writing or reading operation of data with respect to the plural disk drives within said disk drive box body and plural host adapter boards connected to a host device and receiving data from said host device, such that said plural disk adapter boards and said plural host adapter boards are spaced and arranged at intervals for ventilation;
   a processor for management constructed by a PC for industry connected to said plural disk adapter boards and said plural host adapter boards within said controller box body, and collecting and managing management information relating to said plural disk adapter boards and said plural host adapter boards;
   a computer for output used to output said management information managed by said processor for management;
   a fan for exhaust for exhausting a ventilating wind flowed via the interior of said controller box body and a ventilating wind flowed via the interior of said disk drive box body to the exterior of said disk array box body; and
   a power source device for supplying electric power to the plural disk drives within said disk drive box body, said plural disk adapter boards and said plural host adapter boards within said controller box body, said processor for management, said computer for output and said fan for exhaust;
   wherein said disk array box body is constructed such that said processor for management and said computer for output are arranged in positions for preventing no flow of a ventilating wind within said disk drive box body; and
   said computer for output is pulled out of said disk array box body and is further rotated and utilized when said management information is outputted and utilized.

7. The disk array device according to claim 6, wherein said computer for output is constructed so as to be pulled out by a pulling-out mechanism having a slide rail.

8. The disk array device according to claim 7, wherein said computer for output is constructed so as to be placed and supported by a pedestal rotatably arranged with respect to said slide rail.

9. The disk array device according to claim 6, wherein said disk array box body is constructed such that said controller box body is arranged above said power source device through a ventilation interrupting plate for preventing the ventilating wind from said power source device.

10. The disk array device according to claim 9, wherein said disk drive box body is constructed by a first disk drive box body and a second disk drive box body; and said disk array box body is constructed such that said first disk drive box body and said second disk drive box body are arranged by interposing a flow path for passing the ventilating wind flowed via the interior of said controller box body between said first disk drive box body and said second disk drive box body above said controller box body.

11. The disk array device according to claim 10, wherein said disk array box body is constructed such that said processor for management is arranged on the side face of said first disk drive box body; and said computer for output is arranged on the side face of said second disk drive box body so as to be pulled out.

12. The disk array device according to claim 11, wherein said disk array box body is constructed such that said fan for exhaust is arranged above said first disk drive box body and said second disk drive box body.

13. A disk array device comprising:

a disk array box body for arranging a box body therein;

a disk drive box body in which plural disk drives for storing data are spaced at intervals for ventilation and are arranged in a matrix shape;

a controller box body constructed by arranging plural disk adapter boards for controlling the writing or reading operation of data with respect to the plural disk drives within said disk drive box body and plural host adapter boards connected to a host device and receiving data from said host device, such that said plural disk adapter boards and said plural host adapter boards are spaced and arranged at intervals for ventilation;

a processor for management constructed by a PC for industry connected to said plural disk adapter boards and said plural host adapter boards within said controller box body, and collecting and managing management information relating to said plural disk adapter boards, said plural host adapter boards and said plural memory boards;

a computer for output used to output said management information managed by said processor for management;

a fan for exhaust for exhausting a ventilating wind flowed via the interior of said controller box body and a ventilating wind flowed via the interior of said disk drive box body to the exterior of said disk array box body;

a power source device for supplying electric power to the plural disk drives within said disk drive box body, said plural disk adapter boards and said plural host adapter boards within said controller box body, said processor for management, said computer for output and said fan for exhaust; and a front door attached to the front face side of said disk array box body and opening and closing said disk array box body;

wherein said disk array box body is constructed such that said processor for management and said computer for output are arranged in positions for preventing no flow of a ventilating wind within said disk drive box body; and said computer for output is rotatably arranged on the rear face side of said front door and is rotated and utilized with respect to said front door in the opening state of said front door when said management information is outputted and utilized.

14. The disk array device according to claim 13, wherein said computer for output is constructed so as to be placed and supported by a pedestal rotatably arranged with respect to said front door.

15. The disk array device according to claim 13, wherein said disk array box body is constructed by a first disk array box body for arranging said controller box body and said power source device and a second disk array box body for arranging said disk drive box body;

said first disk array box body is constructed such that said controller box body is arranged above said power source device, and said fan for exhaust is arranged above said controller box body; and said second disk array box body is constructed such that said fan for exhaust is arranged above said disk drive box body.

16. The disk array device according to claim 15, wherein said first disk array box body is constructed such that said processor for management is arranged on the side faces of said controller box body and said power source device.

17. The disk array device according to claim 15, wherein said first disk array box body is constructed such that said processor for management is arranged between said power source device and said controller box body.

18. The disk array device according to claim 17, wherein said processor for management is constructed by forming a hole for ventilation in its box body.

19. The disk array device according to claim 15, wherein said first disk array box body is constructed such that said processor for management is arranged on the lower side of said power source device.

20. A disk array device comprising:

a disk array box body for arranging a box body therein;

a disk drive box body in which plural disk drives for storing data are spaced at intervals for ventilation and are arranged in a matrix shape;

a controller box body constructed by arranging plural disk adapter boards for controlling the writing or reading operation of data with respect to the plural disk drives within said disk drive box body, plural host adapter boards connected to a host device and receiving data from said host device, such that said plural disk adapter boards and said plural host adapter boards are spaced and arranged at intervals for ventilation;

a processor for management constructed by a PC for industry connected to said plural disk adapter boards and said plural host adapter boards within said controller box body, and collecting and managing management information relating to said plural disk adapter boards and said plural host adapter boards;

a computer for output used to output said management information managed by said processor for management;

a fan for exhaust for exhausting a ventilating wind flowed via the interior of said controller box body and a ventilating wind flowed via the interior of said disk drive box body to the exterior of said disk array box body;

a power source device for supplying electric power to the plural disk drives within said disk drive box body, said plural disk adapter boards and said plural host adapter boards within said controller box body, said processor for management, said computer for output and said fan for exhaust; and a front door attached to the front face side of said disk array box body and opening and closing said disk array box body;

wherein said disk array box body is constructed by a first disk array box body for arranging said controller box body and said power source device, and a second disk array box body for arranging said disk drive box body;

said first disk array box body is constructed such that said controller box body is arranged above said power source device;

said processor for management is arranged on the side face of said controller box body so as not to prevent the intervals for ventilation between said plural disk adapter boards and said plural host adapter boards within said controller box body;

said computer for output is rotatably arranged on the rear face side of said front door so as not to prevent the intervals for ventilation between said plural disk adapter boards and said plural host adapter boards within said controller box body; and said fan for exhaust is arranged above said controller box body;

said second disk array box body is constructed such that said fan for exhaust is arranged above said disk drive box body; and said computer for output is rotated and utilized with respect to said front door in the opening state of said front door when said management information is outputted and utilized.

* * * * *